(12) United States Patent
Ooba

(10) Patent No.: US 11,036,363 B2
(45) Date of Patent: Jun. 15, 2021

(54) DISPLAY CONTROL APPARATUS AND DISPLAY CONTROL METHOD

(71) Applicant: SONY CORPORATION, Tokyo (JP)

(72) Inventor: Osamu Ooba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/620,952

(22) PCT Filed: May 21, 2018

(86) PCT No.: PCT/JP2018/019508
§ 371 (c)(1),
(2) Date: Dec. 10, 2019

(87) PCT Pub. No.: WO2018/235489
PCT Pub. Date: Dec. 27, 2018

(65) Prior Publication Data
US 2020/0110516 A1 Apr. 9, 2020

(30) Foreign Application Priority Data
Jun. 19, 2017 (JP) .............................. JP2017-119865

(51) Int. Cl.
*G06F 3/0482* (2013.01)
*G06F 16/538* (2019.01)
*G06F 16/532* (2019.01)
*G06F 3/0484* (2013.01)

(52) U.S. Cl.
CPC .......... *G06F 3/0482* (2013.01); *G06F 3/0484* (2013.01); *G06F 16/532* (2019.01); *G06F 16/538* (2019.01)

(58) Field of Classification Search
CPC .... G06F 3/0482; G06F 16/538; G06F 16/532; G06F 3/0484; G06F 3/04842; G06F 3/0481
See application file for complete search history.

(56) References Cited

U.S. PATENT DOCUMENTS

2009/0059022 A1* 3/2009 Tanaka ............... H04N 1/00458
348/222.1
2009/0193359 A1* 7/2009 Anthony ............ H04N 1/00461
715/804

(Continued)

FOREIGN PATENT DOCUMENTS

| CN | 101371575 A | 2/2009 |
|----|-------------|--------|
| CN | 101721199 A | 6/2010 |

(Continued)

OTHER PUBLICATIONS

Min-Uk Kim et al., Fast Image Retrieval System using Representative Images, Jun. 1, 2013, IEEE Xplore, pp. 1-2 (Year: 2013).*

(Continued)

*Primary Examiner* — Tam T Tran
(74) *Attorney, Agent, or Firm* — Chip Law Group

(57) ABSTRACT

Provided is a display control apparatus including: a control unit that performs control of displaying a plurality of representative images extracted from a search target image group, and image group information that indicates presence of an image other than the representative images in the search target image group and is displayed in a form different from the representative images between a plurality of the representative images.

15 Claims, 16 Drawing Sheets

(56) References Cited

U.S. PATENT DOCUMENTS

| | | | |
|---|---|---|---|
| 2010/0097392 A1 | 4/2010 | Nishiyama et al. | |
| 2011/0243452 A1* | 10/2011 | Sakaguchi | G06F 16/54 382/190 |
| 2011/0246942 A1 | 10/2011 | Misawa | |
| 2012/0011473 A1* | 1/2012 | Ohkubo | G11B 27/034 715/838 |
| 2012/0082378 A1* | 4/2012 | Peters | G06F 16/58 382/165 |
| 2014/0344705 A1* | 11/2014 | Dimitrov | H04L 67/42 715/744 |

FOREIGN PATENT DOCUMENTS

| | | | |
|---|---|---|---|
| CN | 102207820 A | 10/2011 | |
| EP | 2177149 A1 | 4/2010 | |
| JP | 2007-221769 A | 8/2007 | |
| JP | 2007-300659 A | 11/2007 | |
| JP | 2010-099139 A | 5/2010 | |
| JP | 2011-029823 A | 2/2011 | |
| JP | 2011-135502 A | 7/2011 | |
| JP | 2011-210138 A | 10/2011 | |

OTHER PUBLICATIONS

William Plant et al., Image Retrieval on The Honeycomb Image Browser, Sep. 1, 2010, IEEE Xplore, pp. 3161-3164 (Year: 2010).*

International Search Report and Written Opinion of PCT Application No. PCT/JP2018/019508, dated Jul. 31, 2018, 10 pages of ISRWO.

Extended European Search Report of EP Application No. 18820355. 8, dated Jul. 3, 2020, 07 pages.

* cited by examiner

DISPLAY CONTROL APPARATUS AND DISPLAY CONTROL METHOD

CROSS REFERENCE TO RELATED APPLICATIONS

This application is a U.S. National Phase of International Patent Application No. PCT/JP2018/019508 filed on May 21, 2018, which claims priority benefit of Japanese Patent Application No. JP 2017-119865 filed in the Japan Patent Office on Jun. 19, 2017. Each of the above-referenced applications is hereby incorporated herein by reference in its entirety.

TECHNICAL FIELD

The present technology relates to a display control apparatus, a display control method, and a display control program.

BACKGROUND ART

Currently, many users use terminal apparatuses such as smartphones and tablet terminals, and retain a large number of images in the storage units of the terminal apparatuses. Because it is not easy to find an intended image from a large number of images, there has been proposed an image search method for a user to search an intended image (Patent Document 1).

CITATION LIST

Patent Document

Patent Document 1: Japanese Patent Application Laid-Open No. 2007-300659

SUMMARY OF THE INVENTION

Problems to be Solved by the Invention

In the method of Patent Document 1, in a case where a user does not understand correct date and time of capturing an image to be searched, it is necessary to frequently change a search display form, which takes time and effort in searching an intended image. Furthermore, there is also a problem that there is a possibility that as a representative image to be displayed, a meaningless image that does not leave much impression on the user, for example, an image captured first on that date and time, is specified, resulting in a problem that it is of no help to the user searching.

The present technology has been made in view of such problems, and it is an object of the present invention to provide a display control apparatus, a display control method, and a display control program that can easily find an intended image from a plurality of images.

Solutions to Problems

In order to solve the aforementioned problem, a first technology is a display control apparatus including: a control unit that performs control of displaying a plurality of representative images extracted from a search target image group, and image group information that indicates presence of an image other than the representative images in the search target image group and is displayed in a form different from the representative images between a plurality of the representative images.

Furthermore, a second technology is a display control method for performing control of displaying a plurality of representative images extracted from a search target image group, and image group information that indicates presence of an image other than the representative images in the search target image group and is displayed in a form different from the representative images between a plurality of the representative images.

Moreover, a third technology is a display control program causing a computer to execute a display control method for performing control of displaying a plurality of representative images extracted from a search target image group, and image group information that indicates presence of an image other than the representative images in the search target image group and is displayed in a form different from the representative images between a plurality of the representative images.

Effects of the Invention

According to the present technology, it is possible to easily find an intended image from a plurality of images. Note that effects described herein are not necessarily limited, but may also be any of those described in the specification.

MODE FOR CARRYING OUT THE INVENTION

Embodiments of the present technology are described below with reference to the drawings. Note that a description will be presented in the following order.

1. Embodiment

[1-1. Configuration of terminal apparatus]
[1-2. Display control processing]
[1-3. Representative image]

2. Application Example

3. Variation

1. Embodiment

[1-1. Configuration of Terminal Apparatus]

A display control apparatus according to the present technology operates in a terminal apparatus such as a personal computer, a tablet terminal, or a smartphone, and displays a user interface for making it easy for a user to find an image from a plurality of images (hereinafter called a search target image group), which is a search target saved in a terminal apparatus 100. In the present embodiment, the display control apparatus is a display control unit 160 that operates in the terminal apparatus 100 including a display unit 140 having a function of a touch panel. Furthermore, a description is given of an example of the case where the terminal apparatus 100 is a smartphone.

Figure 1:
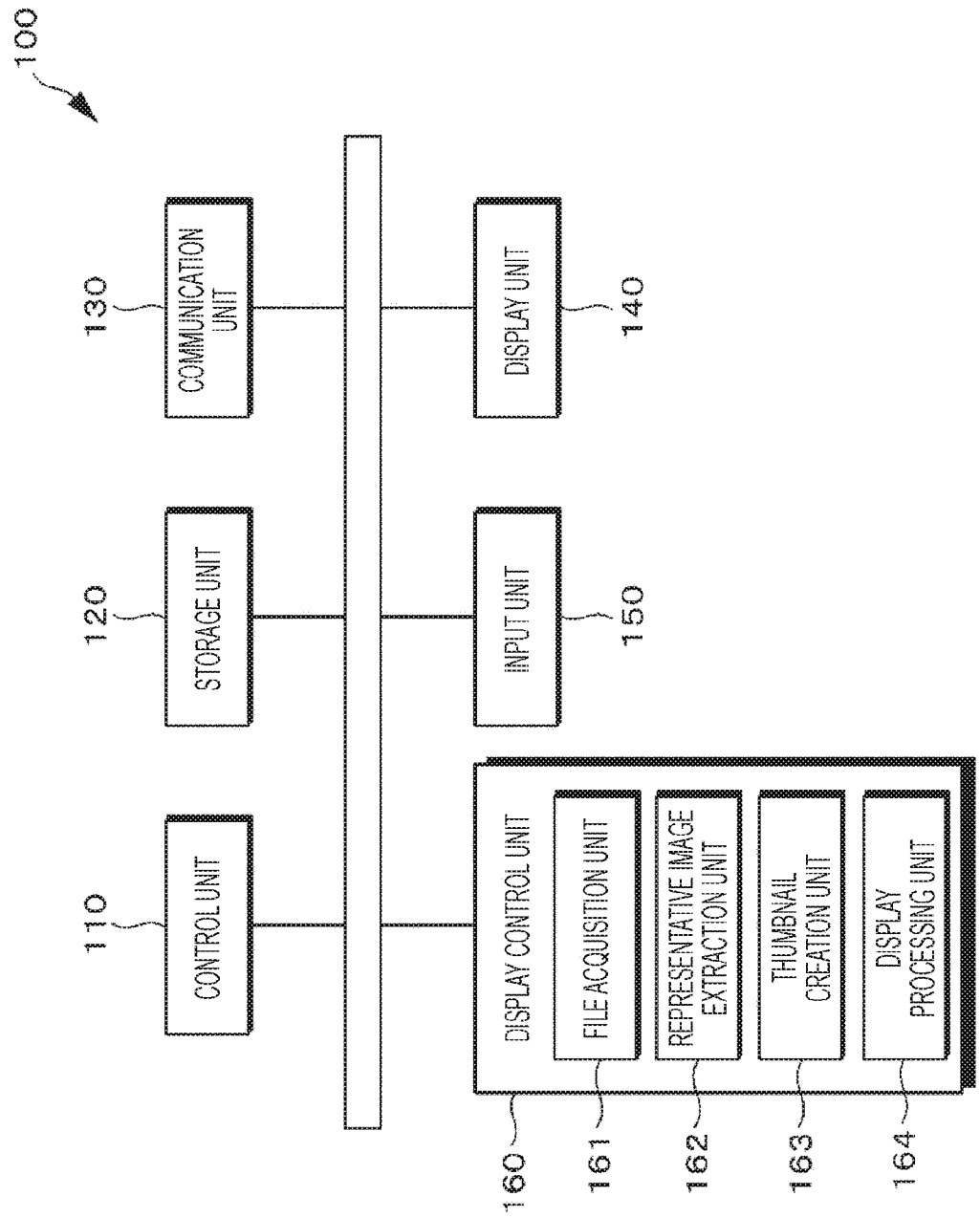
FIG. 1 is a block diagram illustrating a configuration of a terminal apparatus.

The terminal apparatus 100 is described with reference to FIG. 1. The terminal apparatus 100 includes a control unit 110, a storage unit 120, a communication unit 130, the display unit 140, an input unit 150, and the display control unit 160.

The control unit 110 includes a central processing unit (CPU), a random access memory (RAM), a read only memory (ROM), and the like. The ROM stores a program or the like that is read and operated by the CPU. The RAM is used as a work memory of the CPU. The CPU controls the entire terminal apparatus 100 by executing various processing and issuing a command according to a program stored in the ROM.

The storage unit 120 is a mass storage medium, for example, such as a hard disk or an SD memory card. The storage unit 120 can save content, applications, and the like, such as image data, video data, or document files. The image is saved in a compressed state on the basis of a standard, for example, joint photographic experts group (JPEG) or the like. Furthermore, exchangeable image file format (EXIF) data including information associated with the saved image and meta information such as date and time of capture is also associated with the image and saved.

The communication unit 130 is a communication module, a communication connector, or the like for communicating with an external apparatus, the Internet, and the like. The communication by the communication unit 130 may be either wired communication such as USB communication, or wireless communication such as wireless LAN such as Wi-Fi, Bluetooth, ZigBee, 4G (4th generation mobile communication system), or broadband.

The display unit 140 is a display device including, for example, a liquid crystal display (LCD), plasma display panel (PDP), an organic electro luminescence (EL) panel, and the like. The display unit 140 displays the user interface of the terminal apparatus 100, content such as an image, a video, a document file saved in the storage unit 120, the image search user interface according to the present technology, and the like.

The input unit 150 accepts the user's manipulation input on the terminal apparatus 100. When the user's input is made on the input unit 150, a control signal corresponding to the input is generated and output to the control unit 110. Then, the control unit 110 performs arithmetic processing and controls the terminal apparatus 100 corresponding to the control signal. The input unit 150 includes a touch panel configured to be integral with the display unit 140; a pointing device that is manipulated by finger tracing on a flat plate-shaped sensor not integral with the display unit 140, which is called a trackpad or touchpad; a keyboard; a mouse, and the like. In the present embodiment, the display unit 140 is a touch panel configured to be integral with the input unit 150 and performs input when the user contacts the display unit 140 with a finger or a stylus.

The display control unit 160 displays the image search user interface on the display unit 140 and performs display control on the basis of input from the user. The display control unit 160 includes a file acquisition unit 161, a representative image extraction unit 162, a thumbnail creation unit 163, and a display processing unit 164.

The file acquisition unit 161 acquires a search target image displayed on the display unit 140 from the storage unit 120 or the like by processing of the display control unit 160. The representative image extraction unit 162 performs processing of extracting a representative image from the search target image group. Details of the representative image and an aspect of display of the representative image will be described later.

The search target image group is images saved in the storage unit 120 of the terminal apparatus 100 and is, for example, all the images present in an image folder the terminal apparatus 100 includes as a function. Furthermore, in a case where the images are preliminarily sorted into a plurality of subfolders in the image folder, the search target image group may be all the images present in any of the subfolders. Furthermore, the search target image group may be all the images sandwiched between two images which are specified among a plurality of images arranged in the order of capture/acquisition in the image folder. It is sufficient if the user can specify the range of the image folder as the search target image group before use of the image search user interface according to the present technology.

The representative image is "an image on which the user has previously performed predetermined processing or manipulation" and/or "an image including multistage color information."

Such an image is probably vividly retained in the user's memory and is probably considered to be an intended image the user searches. The representative image is an image spaced away in the arrangement order of images in the search target image group. The phrase "spaced away in the arrangement order" means that, in a state where images are saved in the storage unit 120 (image folder or the like) in a certain arrangement order, an extracted representative image is away from (not next to) another representative image in the arrangement order. Examples of the certain arrangement order include the order of capture/acquisition, and being spaced away in the order of capture/acquisition indicates, for example, being spaced away in terms of period (time, hours, minutes, seconds, seasons, years, months, days, or the like) in the order of capture/acquisition. Being "spaced away in terms of period" is a mere example, and the representative image may be spaced away on the basis of any references as long as the representative image extracted from a plurality of images arranged in a certain arrangement order is spaced away in the arrangement order. Furthermore, the certain arrangement order includes an arrangement order decided and set by the user, an arrangement order decided and set by the terminal apparatus 100 using an algorithm, and the like, and may be any arrangement order as long as a plurality of images is arranged on the basis of a certain reference. Specific examples of the representative image will be described later.

The thumbnail creation unit 163 creates a thumbnail image from the search target image acquired by the file acquisition unit 161. Display of a thumbnail image will be described later.

The display processing unit 164 performs processing of displaying the search target image acquired by the file acquisition unit 161, the representative image extracted by the representative image extraction unit 162, or the like on the display unit 140, and displaying the image search user interface according to the present technology on the display unit 140.

Note that the display control unit 160 includes a program, and the program may be preliminarily installed in the terminal apparatus 100 or may be downloaded or distributed by a storage medium or the like so as to be installed by the user himself/herself. Furthermore, the control unit 110 may function as the display control unit 160, and the display control unit 160 may be configured to be independent of the control unit 110. Moreover, the display control unit 160 may be achieved not only by the program but by a combination of a dedicated apparatus, circuit, and the like of hardware having such a function.

The terminal apparatus 100 is configured in the aforementioned manner.

[1-2. Display Control Processing]

Figure 2:
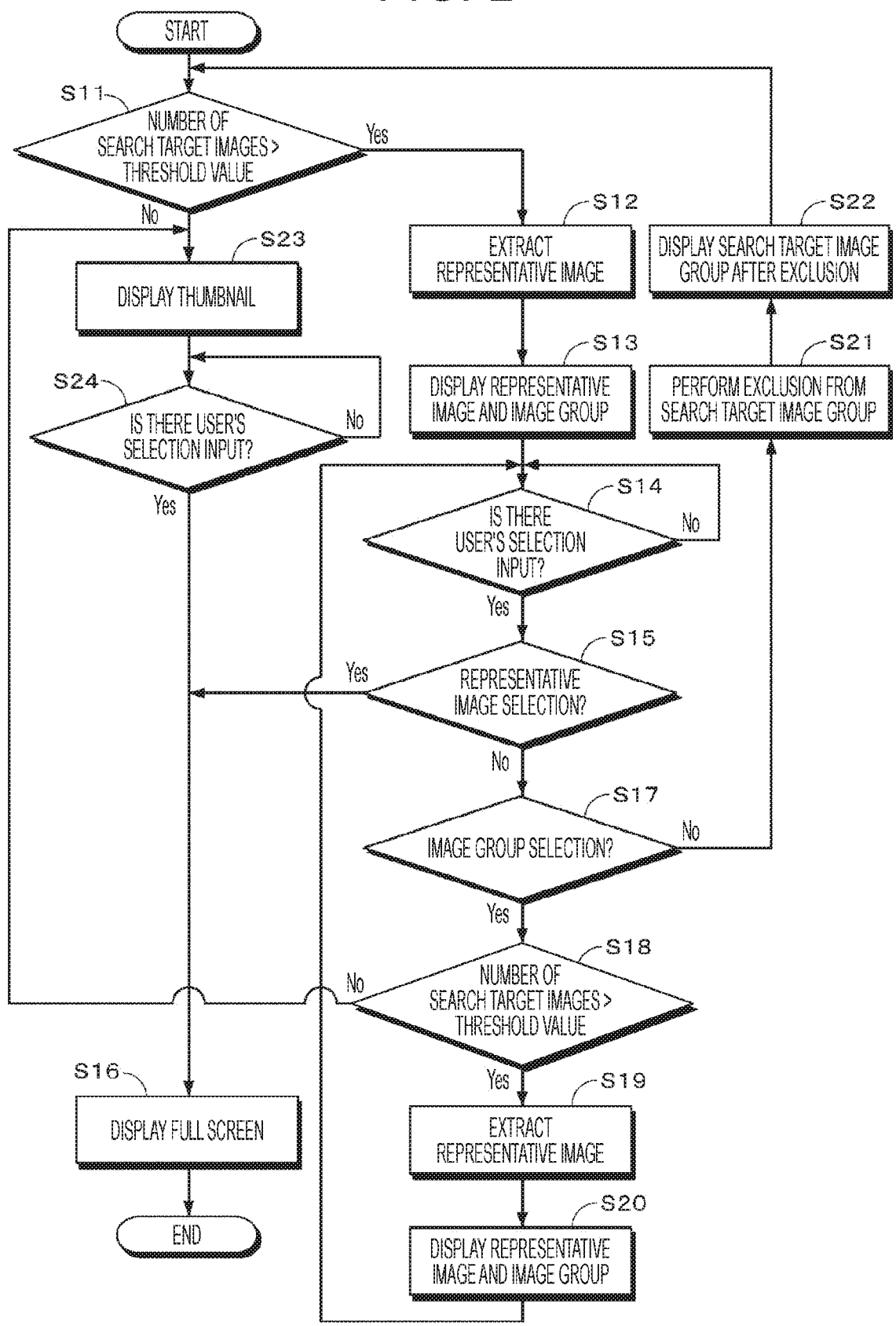
FIG. 2 is a flowchart illustrating a flow of display control processing.

Next, the display control processing of the image search user interface performed by the display control unit 160 is described. FIG. 2 is a flowchart illustrating a flow of the display control processing. First, in step S11, the number of images of the search target image group is compared with an all image display threshold value. In a case where the number of images of the search target image group is equal to or more than the all image display threshold value, the processing proceeds to step S12 (No in step S11).

Next, in step S12, the representative image is extracted from the search target image group. A plurality of images included in the search target image group is sorted into groups of a predetermined number of pieces, and the representative image is extracted with respect to each group. For example, the search target image group may be sorted into groups of a predetermined number of pieces such as 50 pieces or 100 pieces, and the representative image may be extracted from each group.

For example, in a case where 200 images are included in the search target image group, and the representative image is extracted with respect to 50 pieces, the representative image is extracted from a group of 1st to 50th pieces, a group of 51st to 100th pieces, a 101st to 150th pieces, and a group of 151st to 200th pieces. The number of images for which the representative image is extracted may be set by default, may be set by the user, or may be set by the display control unit 160 depending on the number of images of the search target image group.

Furthermore, a plurality of images included in the search target image group may be sorted into groups on the basis of meta information associated with the images, and the representative image may be extracted with respect to each group. For example, in a case where information of date and time of capture/acquisition associated with the images is used, the images of the search target image group may be sorted into groups in units of "month," and the representative image can be extracted. In a case where 200 images are included in the search target image group, the images are sorted into groups such that, for example, 1st to 50th pieces are images captured/acquired on January, 51st to 80th pieces are images captured/acquired on February, 81st to 134th pieces are images captured/acquired on March, and 135th to 200th pieces are images captured/acquired on April. Then, the representative image is extracted with respect to each group.

Figure 3A:
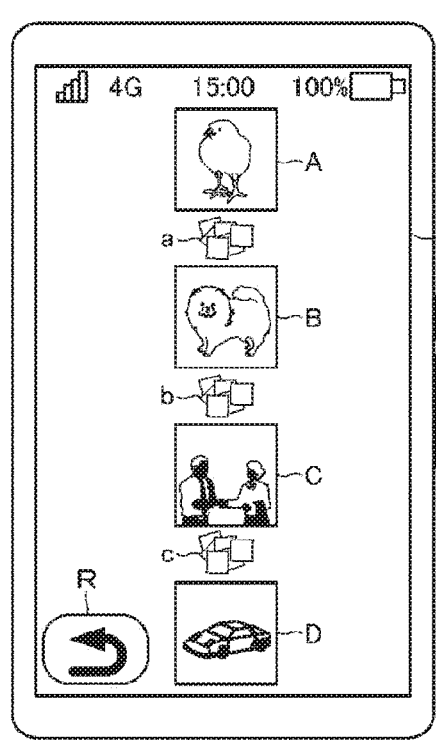
FIGS. 3A, 3B, and 3C are views illustrating an image search user interface displayed on a display unit.

Next, in step S13, as illustrated in FIG. 3A, the display unit 140 displays a plurality of representative images and a plurality of image groups, and transitions to a first state. Furthermore, on the image search user interface, the display unit 140 displays a "return button R."

The return button R is a button for giving an instruction of redoing input performed by the user for image searching. In the present embodiment, the return button R includes a software button.

In the first state, a plurality of representative images extracted from the search target image group and image groups, which are information indicative of an image other than the representative image in the search target image group, are arranged and displayed in a line. The image group is not in a state where images can be separately viewed one by one, but is indicated as an icon with which it is understood that there is a plurality of images. The icon indicating the image group corresponds to the image group information in the claims.

The representative image and the image group are arranged and displayed alternately, and, in FIG. 3A, a representative image A, an image group a, representative image B, an image group b, a representative image C, an image group c, and a representative image D are displayed in order from the top.

Figure 5:
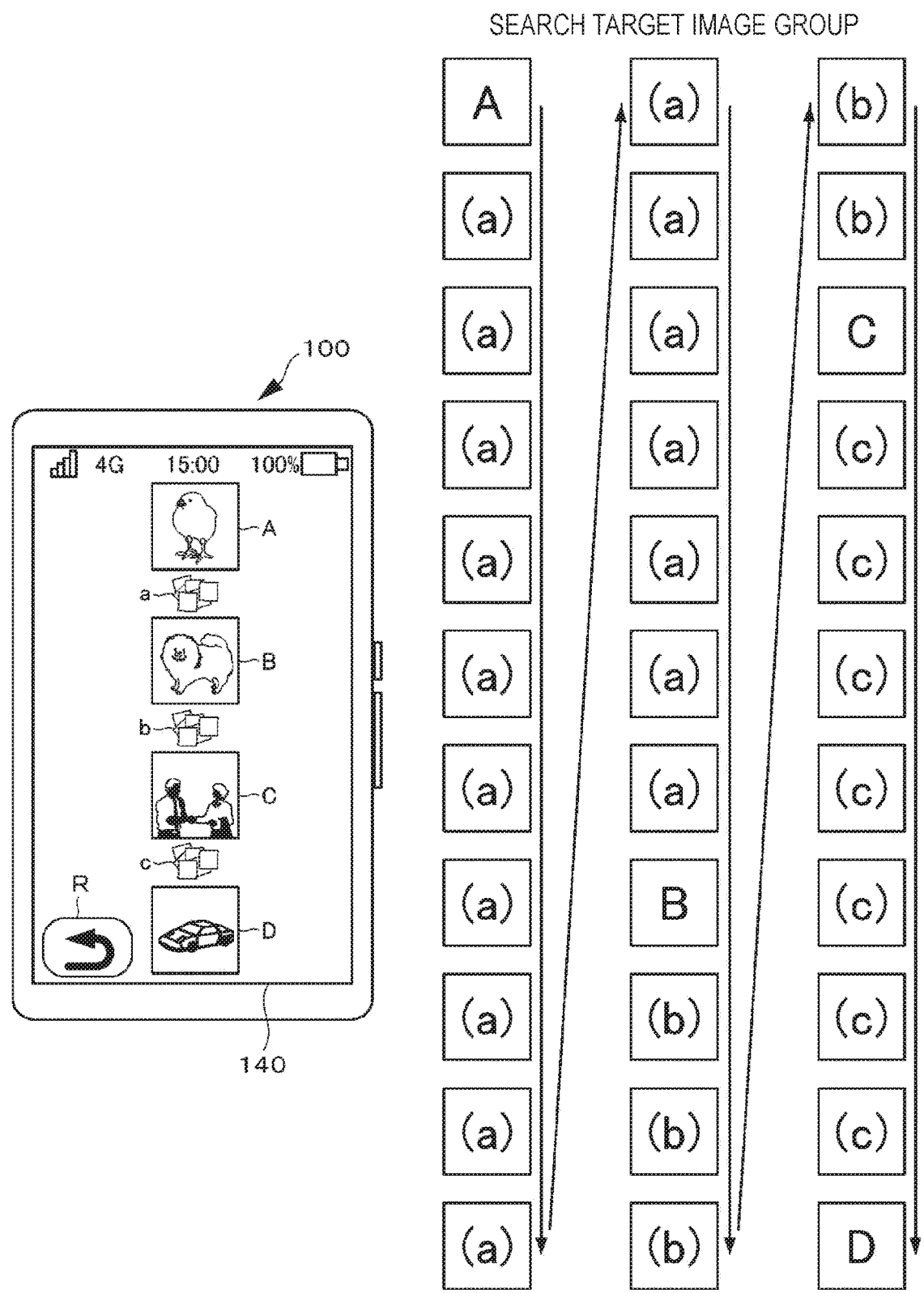
FIG. 5 is a view explaining an order of images displayed on an image search user interface.

In the first state, as indicated by the arrows in FIG. 5, representative images extracted from a plurality of search target images and image groups indicative of a plurality of images other than the representative image saved in the image folder of the storage unit 120 are displayed in a predetermined order (for example, capture/acquisition order). The image group indicates a plurality of images arranged between a representative image and a next representative image. Thus, the numbers of images in the image groups indicated by the image groups are different.

In FIG. 5, an image included in the image group a is indicated as (a), an image included in the image group b is indicated as (b), and an image included in the image group c is indicated as (c).

Next, in step S14, it is determined whether or not the user's selection input has been made on the representative image, the image group, or the return button R. In a case where selection input has been made, the processing proceeds to step S15 (Yes in step S14).

Figure 3B:
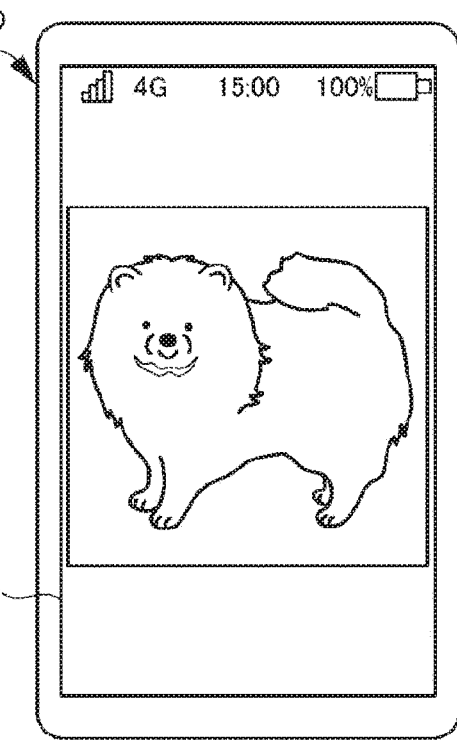

Next, in step S15, it is determined whether or not the user's selection input is a selection input on the representative image. In a case where the input is a selection input on the representative image, the processing proceeds to step S16 (Yes in step S15). Then, in step S16, as illustrated in FIG. 3B, a second state is provided in which the image selected by the user is displayed full screen on the display unit 140. In FIG. 3B, the representative image B selected by the user is displayed full screen. The selected image is an intended image the user has searched, and therefore is displayed full screen on the display unit 140 and presented to the user.

In the second state, registration of an image to favorites, predetermined image processing (trimming, rotation, brightness adjustment, color adjustment, image synthesis, icon superimposition, or the like), transmission of e-mail with attachment, uploading onto an SNS, an image sharing site, or the like on the Internet, and the like may be performed directly.

Meanwhile, in step S15, in a case where the user's input is not an input of selecting the representative image, the processing proceeds to step S17 (No in step S15). Next, in step S17, it is determined whether or not the user's selection input is an input of selecting any of the image groups displayed on the display unit 140.

In a case where the user's input is an input of selecting any of the image groups, the processing proceeds to step S18 (Yes in step S17). Next, in step S18, the number of images of the search target image group is compared with the all image display threshold value. In a case where the number of images of the search target image group is equal to or more than the all image display threshold value, the processing proceeds to step S19 (Yes in step S18).

Then, in step S19, a new representative image is extracted from the selected image group. Next, the processing proceeds to step S20, and, as illustrated in FIG. 3C, transition is made to a third state in which the new representative image extracted from the image group selected by the user and the image group are displayed on the display unit 140.

The case in which the user does not select a representative image, but selects an image group is the case where the image the user has searched is not the currently displayed representative image, but is present in the image group. The user views the plurality of representative images displayed on the display unit 140 and makes an educated guess as to where the image being searched is on the basis of the order of saved images, the relevance of images, and the like, and selects an image group.

Figure 3C:
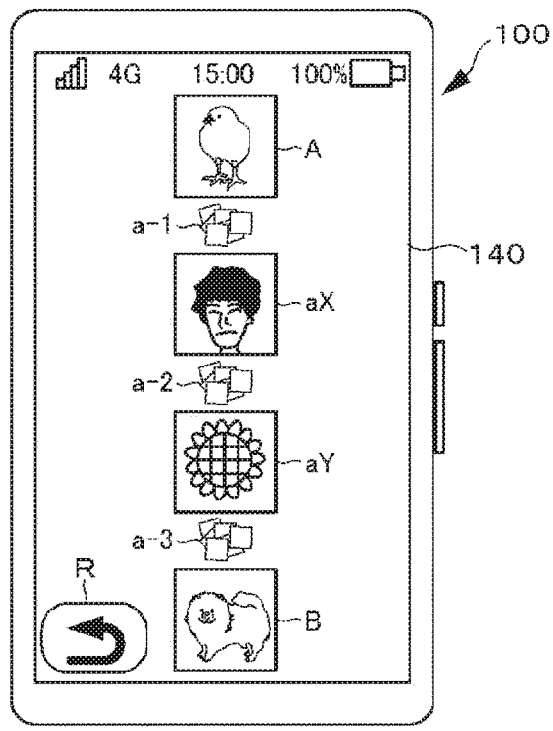

In FIG. 3C, the user's input is made on the image group a, and a representative image aX, a representative image aY, an image group a-1, an image group a-2, and an image group a-3 extracted from the image group a are newly displayed.

Figure 6:
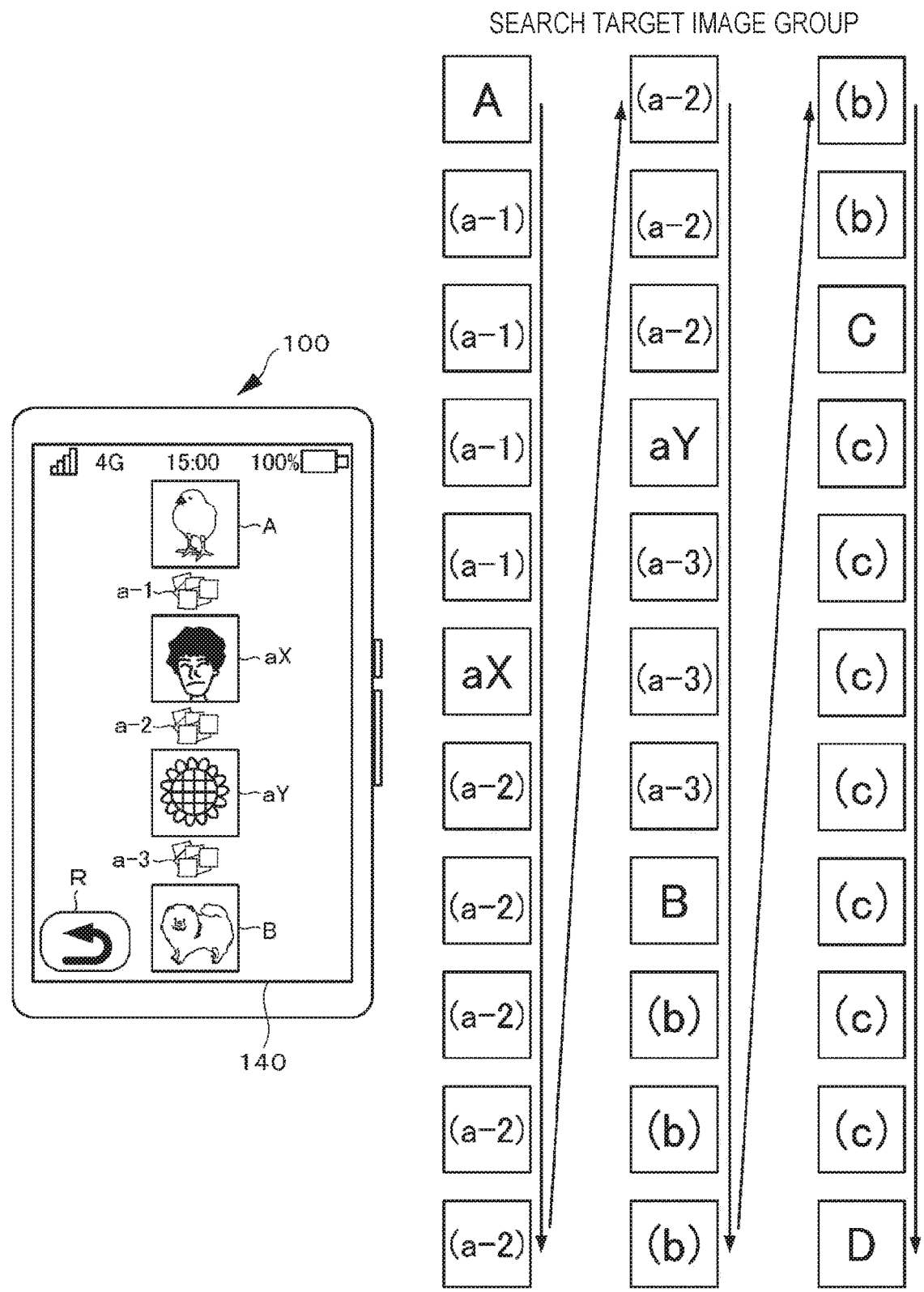
FIG. 6 is a view explaining an order of images displayed on an image search user interface.

In this respect, a description is given with reference to FIG. 6. When the image group a is selected by the user, in step S19, new representative images are extracted from a plurality of images included in the image group a. Then, in step S20, the new representative image aX and the representative image aY are displayed between the representative image A and the representative image B. Moreover, a new image group a-1 is displayed between the representative image A and the representative image aX, a new image group a-2 is displayed between the representative image aX and the representative image aY, and a new image group a-3 is also displayed between the representative image aX and the representative image B. The image group a-1, the image group a-2, and the image group a-3 are all images included in the image group a.

In FIG. 3C and FIG. 6, the image included in the image group a-1 is indicated as (a-1), the image included in the image group a-2 is indicated as (a-2), and the image included in the image group a-3 is indicated as (a-3). The image group a-1 is an image arranged between the representative image A and the representative image aX. Furthermore, the image group a-2 is an image arranged between the representative image aX and the representative image aY. Moreover, the image group a-3 is an image arranged between the representative image aY and the representative image B.

Thus, when representative images are newly extracted, images arranged between a representative image and a representative image in the search target image group arranged in a predetermined order (for example, capture/acquisition order) are collected and displayed as a new image group Therefore, the number of images included in individual image group is the same or different depending on the cases.

Note that, in the above description, when the image group a is selected, the representative image aX and the representative image aY are extracted from the image group a, but the number of representative images extracted from the image group is not limited to two. The description is a mere example, and the representative image extracted can be one or three or more depending on the cases.

Note that, in FIG. 3C, a representative image C, an image group c, or a representative image D is not appeared, but, in a case where not all representative images or image groups can be displayed on the single screen of the display unit 140, it is sufficient if a representative image and an image group, which are not displayed, are displayed by scrolling the screen in an up-and-down direction or the like.

The flowchart is described again. The processing proceeds from step S20 to step S14, and, in step S14 to step S17, the processing depending on the user's selection input is performed.

Meanwhile, in step S17, in a case where the user's selection input is not a selection input on the image group, because the user's input is neither a selection input on the representative image nor a selection input on the image group, but is an input on the return button R, the processing proceeds to step S21 (No in step S17).

Then, in step S21, the image group from which the representative image has been extracted in most recent step S19 and the representative image arranged one before the image group from which the representative image has been extracted in step S19 in the search target image group are excluded from the search target image group. Then, in step S22, the display unit 140 displays the representative image and the image group other than the image group corresponding to the representative images and image groups excluded from the search target image group.

Figure 4A:
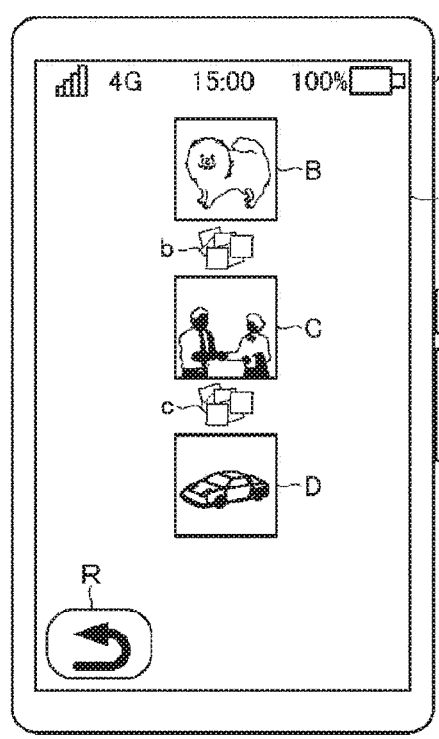
FIGS. 4A, 4B, and 4C are views illustrating an image search user interface displayed on a display unit.

In this respect, a description is given of the case in which it is assumed that the user performs selection input on the image group a and then input is made on the return button R. Given the fact that the user selected the image group a and then performed input on the return button R, the intended image has not presented in any of the image group a-1, the representative image aX, the image group a-2, the representative image aY, and the image group a-3 displayed on the display unit 140 as illustrated in FIG. 3C, after being expanded from the image group a. Thus, the image group a-1, the representative image aX, the image group a-2, the representative image aY, and the image group a-3 are excluded from the search target image group and hidden. Moreover, given the fact that the representative image A, which is a representative image one before in the arrangement order of the selected image group a, has not been selected, it is not the intended image of the user, and is excluded from the search target image group and hidden. Thus, display on the display unit 140 is a state illustrated in FIG. 4A.

Thus, in a case where the image group is selected and input is made on the return button R without selection of a specific image, the intended image of the user is not present in the image group, and therefore the image is excluded from the search target image group. Moreover, the image excluded from the search target image group is hidden. Until the intended image of the user is found, the above input and corresponding processing are repeated such that the search target images are gradually reduced and the search target is narrowed to make it easy to find the intended image.

Then, the processing returns to step S11, and the number of images of the search target image group is compared with the all image display threshold value. Here, what is compared with the full screen display threshold value is the search target image group including the reduced number of images by exclusion processing in step S21.

Figure 4B:
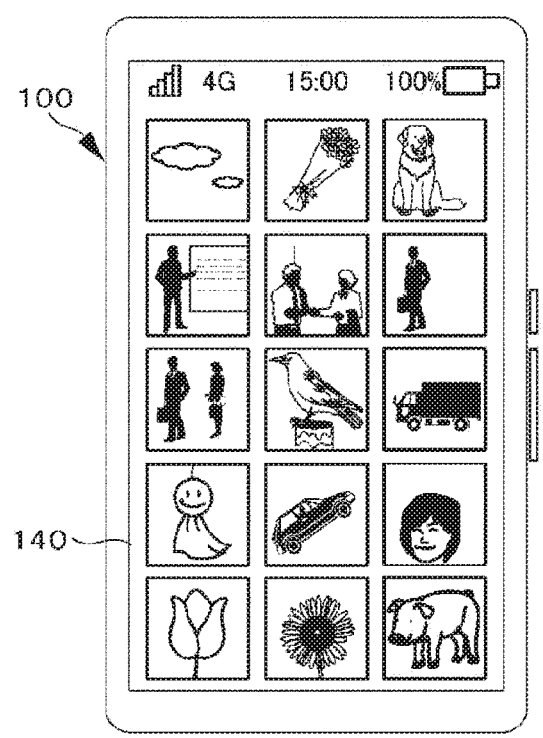

In a case where the number of images of the search target image group is equal to or less than the all image display threshold value, the processing proceeds to step S23 (No in step S11). Then, in step S23, thumbnail images of all the images of the search target image group are created by the thumbnail creation unit 163, and the thumbnail images are displayed on the display unit 140 as illustrated in FIG. 4B. This is because, in a case where the number of images of the search target image group is equal to or less than the all image display threshold value and all the images of the search target image group can be displayed on the display unit 140, it is favorable to perform thumbnail display such that the user can view the individual images.

Next, in step S24, it is determined whether or not there has been the user's selection input on any of the displayed thumbnail images. This selection input is for the user, when the intended image searched from the displayed thumbnail images is found, to select the image and perform various processing or the like. In the case of absence of selection input, the determination of step S24 is repeated until selection input is made (No in step S24). Then, in the case of the presence of the user's selection input, the processing proceeds to step S16 (Yes in step S24).

Figure 4C:
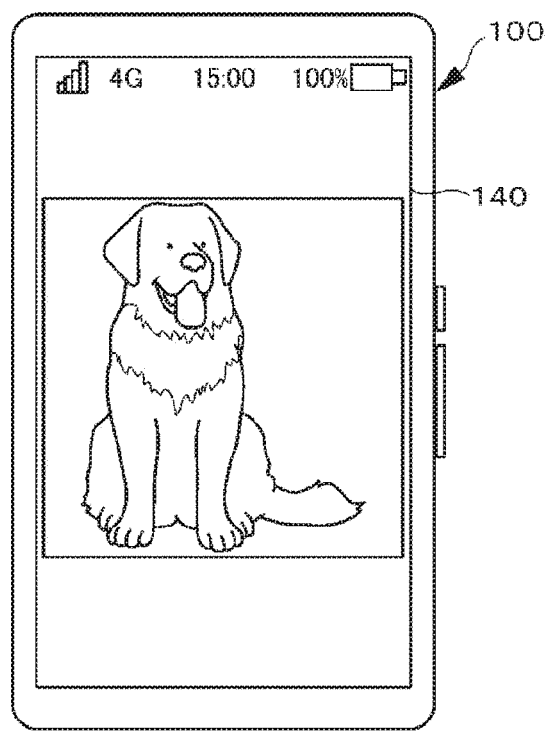

Then, in step S16, as illustrated in FIG. 4C, the image selected by the user is displayed full screen on the display unit 140, and the processing ends. The selected image is an intended image the user has searched, and therefore is displayed full screen on the display unit 140 and presented to the user.

Furthermore, in a case where the number of images of the search target image group is equal to or less than the all image display threshold value in step S18, the processing proceeds to step S23 (No in step S18). Then, in step S23, thumbnail images of all the images of the search target image group are created by the thumbnail creation unit 163, and the thumbnail images are displayed on the display unit 140.

Note that, in a case where a new representative image and a new image group are displayed upon reception of the user's selection input on the image group, the state in which the new representative image and the new image group are expanded from the selected image group may be displayed by animation. Thus, the user can easily understand from which image group the representative image and the image group are expanded.

[1-3. Representative Image]

Next, a specific example of the representative image is described. A first example of the representative image is an image to which the user has added tag information (including lock, favorites, and the like). This is because an image locked (protected) by the user so as not to be deleted from the terminal apparatus 100 and an image registered to favorites are of course considered to vividly retain in the user's memory.

A second example of the representative image is an image on which predetermined image processing (trimming, rotation, brightness adjustment, color adjustment, image synthesis, icon superimposition, or the like) has performed. Given the fact that the user has performed such image processing, it is presumed that the user want to save the image in a more favorable state, and it is presumed that such an image is probably the image the user searches. Furthermore, it is considered that an image on which such image processing has been performed is probably transmitted by the user to friends or uploaded on an SNS, an image sharing site, or the like on the Internet, and vividly retains in the user's memory, and is probably the image the user searches. In a case where the representative image is extracted on the basis of presence or absence of image processing, it is necessary to save the history of image processing on the image. Furthermore, in a case where the terminal apparatus 100 has a function of saving the image processing history, the display control unit 160 may obtain the history from the terminal apparatus 100.

A third example of the representative image is an image whose number of times of display is equal to or more than a predetermined number of times. The display, in this case, means the number of times the image is displayed full screen on the display unit 140. In a case where the number of times of display of the image is equal to or more than the predetermined number of times, this means that the user has looked at the image or has shown the image to others many times. Thus, it is presumed that such an image is probably the image that vividly retains in the user's memory and is searched by the user. Note that, in a case where the representative image is extracted on the basis of the number of times of display, the display control unit 160 is required to count and save the number of times of display of each image. Furthermore, in a case where the terminal apparatus 100 has a function of counting the number of times of display, the display control unit 160 may obtain information of the number of times of display from the terminal apparatus 100.

A fourth example of the representative image is an image whose display time is equal to or more than predetermined time. The display time in this case means, for example, the length of time of full screen display on the display unit 140. In a case where the image display time is equal to or more than the predetermined time, it means that the user has looked at the image or shown the image to others for a long period of time. Thus, it is presumed that such an image is probably the image that vividly retains in the user's memory and is searched by the user. Note that, in a case where the representative image is extracted on the basis of the display time, the display control unit 160 is required to measure and save the display time with respect to each image. Furthermore, in a case where the terminal apparatus 100 has a function of measuring display time, the display control unit 160 may obtain display time information from the terminal apparatus 100.

A fifth example of the representative image is an image whose number of times of image sharing is equal to or more than a predetermined number of times. Here, sharing indicates that an image is brought into a state in which others other than oneself can look at the image in such a way that the image is sent to friends by emails or an intercommunication application, the image is uploaded on an SNS or an image sharing site on the Internet, or the like. Note that, in a case where the representative image is extracted on the basis of the number of times of sharing, the display control unit 160 is required to count and save the number of times of sharing with respect to each image.

In a case where the terminal apparatus 100 has a function of sharing an image selected by the user from the image folder, the terminal apparatus 100 can understand the number of times the processing (sharing) is performed. In a case where the number of times the sharing has been performed previously is equal to or more than the predetermined number of times, it is presumed that the image is probably the image that vividly retains in the user's memory and is searched by the user. Thus, in a case where the terminal apparatus 100 has such a function of counting the number of times of sharing, the display control unit 160 may obtain information of the number of times of sharing from the terminal apparatus 100.

Figure 7:
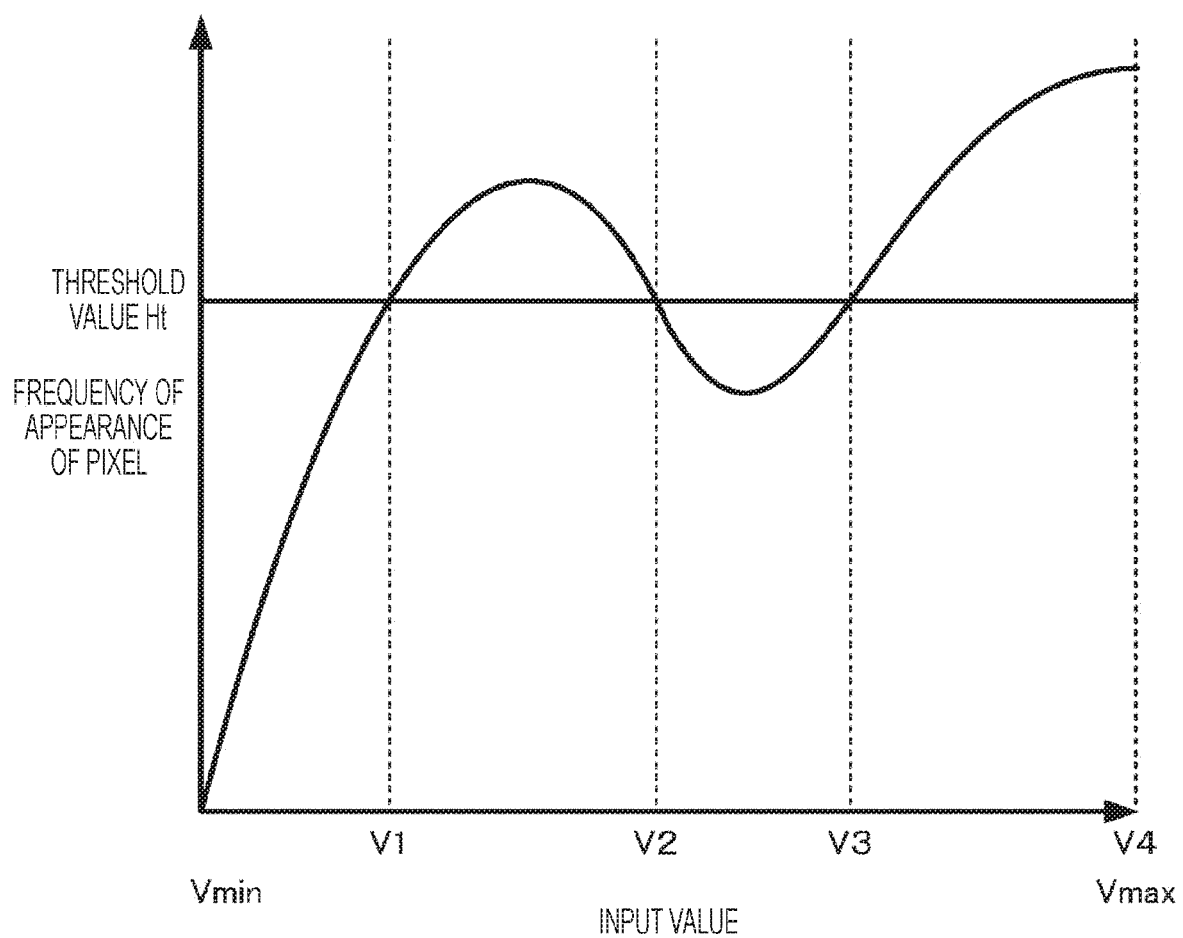
FIG. 7 is an explanatory view extracting a representative image on the basis of a histogram of an image.

Furthermore, in addition to the aforementioned first to fifth examples, "an image having multistage color information" can also be the representative image. Here, the color information includes general information indicating a color space such as RGB (Red, Green, Blue) or YUV. Furthermore, information of brightness based on monotonous black and white is also included. There is a method using a histogram as an example of a method for distinguishing an image having multistage color information. In this respect, a description is given with reference to FIG. 7. FIG. 7 illustrates an example of a histogram of an image. The horizontal axis is input value V indicative of color information of an image, and the vertical axis is frequency of appearance of pixel based on the number of pixels. The graph of FIG. 7 indicates to what extent the pixels having colors are present in an image with respect to color information.

Predetermined threshold value Ht is set with respect to frequency of appearance of pixel of the vertical axis, input values of color information at points on which the curve of the graph crosses the threshold value Ht are V1, V2, and V3, and the maximum value of the input value of the color information of the graph is V4. Then, in a case where Formula (1) below is satisfied, an image has multistage color information.

[Math. 1]

$$((V2-V1)+(V4-V3))/(V\max-V\min) > Wt \qquad (1)$$

In Formula (1), Vmax is the maximum value of the input value V, Vmin is the minimum value of the input value V, and Wt is a threshold value with respect to ratio W of the input value V of equal to or more than the threshold value set with respect to the number of pixels to the entire image. Note that the method for determining whether or not the aforementioned image has multistage color information is a mere example, and the present technology is not limited thereto.

Image display processing according to the present embodiment is carried out in the manner described above. According to the present technology, when the user searches an intended image from a large number of images, an image that is probably an image that vividly retains in the user's memory and is searched by the user can be presented preferentially, and therefore the user can quickly and easily find the intended image.

Moreover, according to the present technology, it is possible to search an intended image without inputting search conditions, for example, date and time, location, or the like. Thus, even when the user does not remember correct conditions (date and time of capture/acquisition or the like) for capturing the intended image, it is possible to quickly and easily find the intended image.

As compared with the searching form of displaying all search target images or the searching form of displaying a representative image only, it is possible to reduce the burden on searching by the user.

In a case where return manipulation is carried out on the return button R as a result of false searching, because the number of search target images is reduced, it is possible to narrow search target images, and thus the burden on re-searching can be reduced and the precision of searching can be increased gradually.

Note that an image that can be displayed and searched on the display unit 140 according to the present technology is not limited to an image acquired by capturing with a camera function. The image may be an image saved from a website on the Internet, a thumbnail image of a moving image, a jacket image associated with an audio file, an icon image of an application, a favicon image of a website, or the like.

Note that, in cooperation with a music playback application, a moving image playback application, or the like of the terminal apparatus 100, or by providing an application with the function according to the present technology, music composition searching and moving image searching can be performed with the function of the present technology. Furthermore, the present technology may be applied to icon images of a plurality of applications installed on the terminal apparatus 100 such that the applications can be searched.

Figure 8:
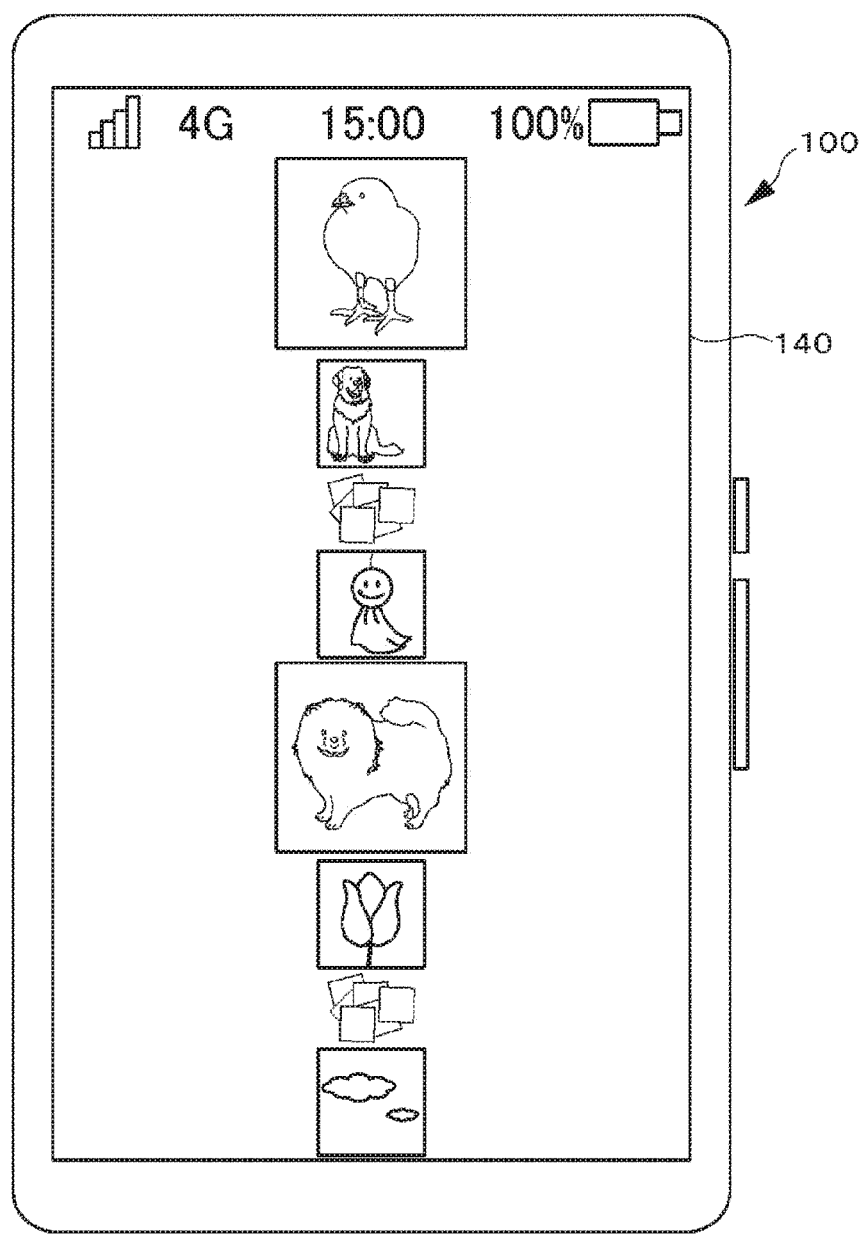
FIG. 8 is a view illustrating another example of an image search user interface.

Note that, in a case where the display unit 140 displays the representative image and the image group, as illustrated in FIG. 8, images before and after a representative image may be displayed not as an image group, but as single images having a size smaller than the representative image. Because the representative image is probably an image that vividly retains in the user's memory and is searched by the user, images before and after the representative image (images obtained before and after the representative image in chronological order) are also probably considered as images the user searches.

Figure 9A:
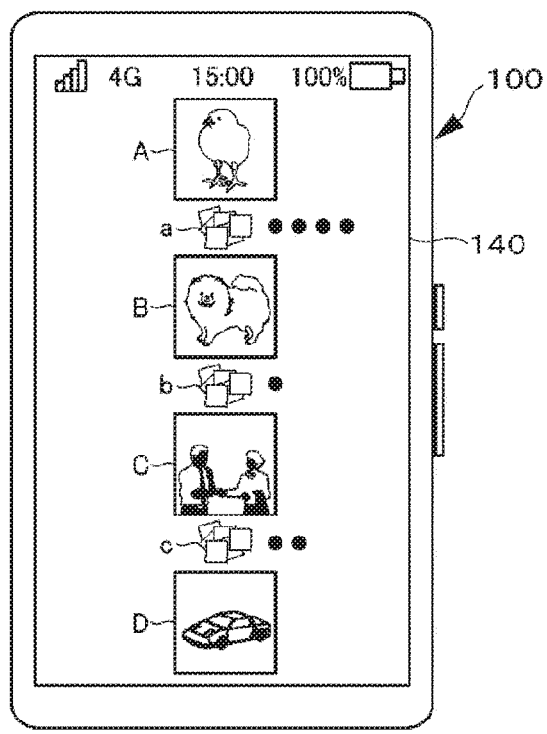
FIGS. 9A and 9B are views illustrating another example of an image search user interface.

Moreover, an icon/symbol indicative of the number of images included in an image group may be displayed around the image group. For example, as illustrated in FIG. 9A, one point is defined to mean ten images, and four points are displayed in a case where 40 images are present in an image group. Furthermore, for example, in a case where 22 images are present in an image group, the number is rounded down and two points are displayed.

Figure 9B:
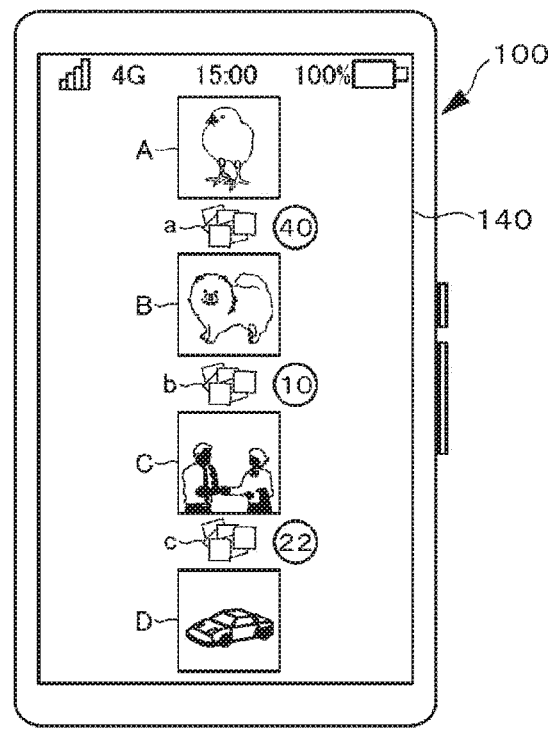

Furthermore, a numerical value indicative of the number of images included in an image group may be displayed around the image group. For example, in a case where 50 images are included in an image group, 50 is displayed next to the image group as illustrated in FIG. 9B. By displaying in this manner, the user can easily understand how many images the image group includes, and it is possible to further increase the efficiency of image searching.

In the embodiment, a search target image group is described to be sorted into a plurality of groups and a representative image is extracted from each group. However, when a representative image is extracted on the basis of one reference, there can be a case where a large number of representative images is extracted from one group. For example, it is the case in which there is a large number of images registered to favorites by the user in the same group, the case in which, in a case where a representative image is extracted on the basis of the number of times of display, there is a large number of images whose number of times of display is the same in the same group, or the like.

Figure 10:
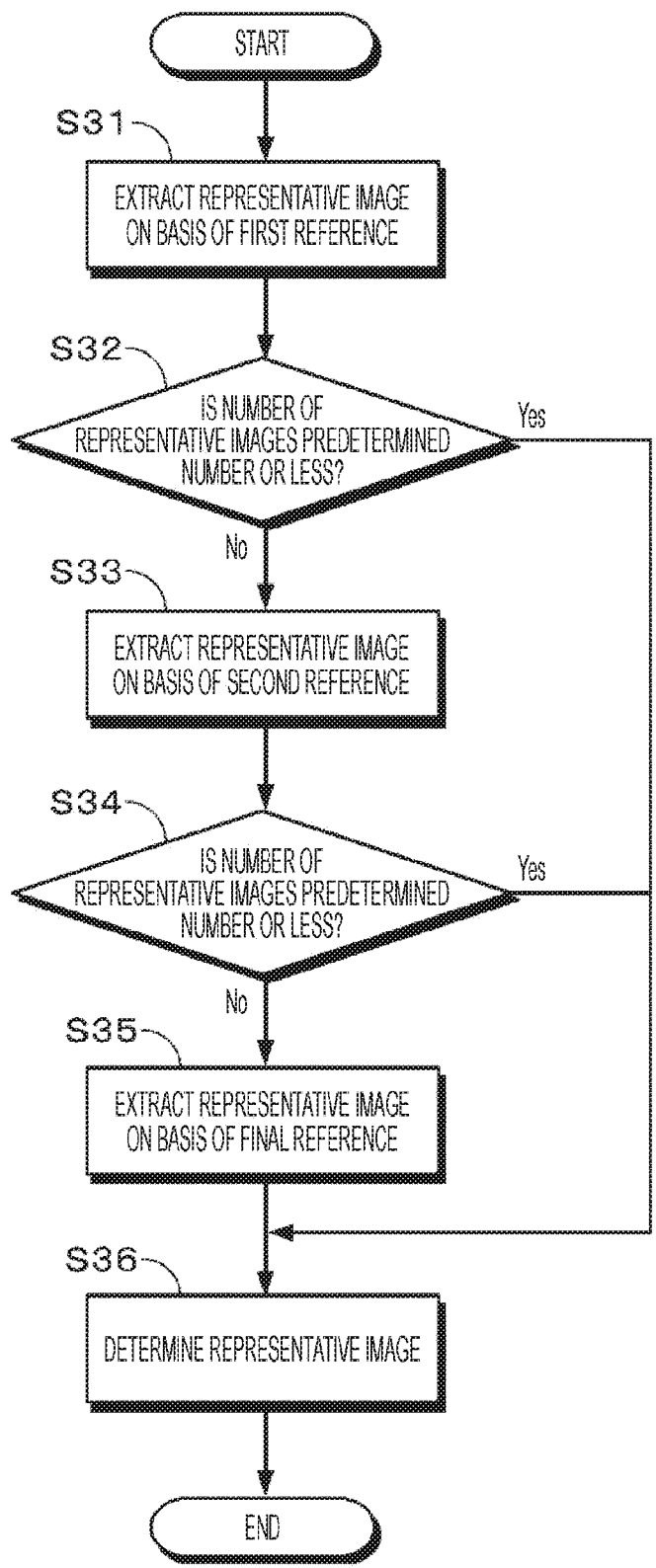
FIG. 10 is a flowchart illustrating processing of another example of representative image extraction.

In order to prevent such cases, it is sufficient if a plurality of references is used in combination in extraction of a representative image and the degree of priority is preset to the plurality of references. For example, the processing illustrated in the flowchart of FIG. 10 may be performed to extract a representative image. In the flowchart of FIG. 10, three references are used to extract a representative image.

First, in step S31, a representative image is extracted on the basis of a first reference. Next, in step S32, it is determined whether the extracted representative image is equal to or less than a predetermined number of pieces, and in a case where the representative image is equal to or less than the predetermined number of pieces, the processing proceeds to step S36 (Yes in step S32), and the extracted image is determined to be the representative image.

Meanwhile, in a case where the representative image is determined to be not equal to or less than the predetermined number of pieces in step S32, the processing proceeds to step S33 (No in step S32). Next, in step S33, a representative image is extracted on the basis of a second reference from a plurality of representative images extracted in step S31.

Then, in step S34, it is determined whether the representative image extracted in step S33 is equal to or less than a predetermined number of pieces, and in a case where the representative image is equal to or less than the predetermined number of pieces, the processing proceeds to step S36 (Yes in step S34), and the image extracted in step S33 is determined to be the representative image.

Meanwhile, in a case where the representative image is determined to be not equal to or less than the predetermined number of pieces in step S34, the processing proceeds to step S35 (No in step S34). Next, in step S35, a representative image is extracted on the basis of a final reference from a plurality of representative images extracted in step S33. The final reference in this case is a reference in which two or more images are not extracted, for example, "extraction of an image that comes earlier in terms of date and time of capture/obtainment" or the like Then, in step S36, one image is determined to be the representative image to be finally extracted. In this way, one representative image can be extracted at the end invariably. Note that, in the flowchart of FIG. 10, the representative image is extracted on the basis of the first reference, the second reference, and the final reference, but the number of references to be used is not limited to three for the sake of convenience of description. Furthermore, the number of pieces of representative image to be extracted from one group may not be invariably one, but may be plural.

Furthermore, the all image display threshold value described in the embodiment does not invariably match the number of thumbnail images that can be displayed on the display unit 140 simultaneously at all once. For example, in a case where the maximum number of thumbnail images that can be simultaneously displayed on the display unit is 15 as illustrated in FIG. 11A, the all image display threshold value may be 15 or may be 15 or more.

Figure 11A:
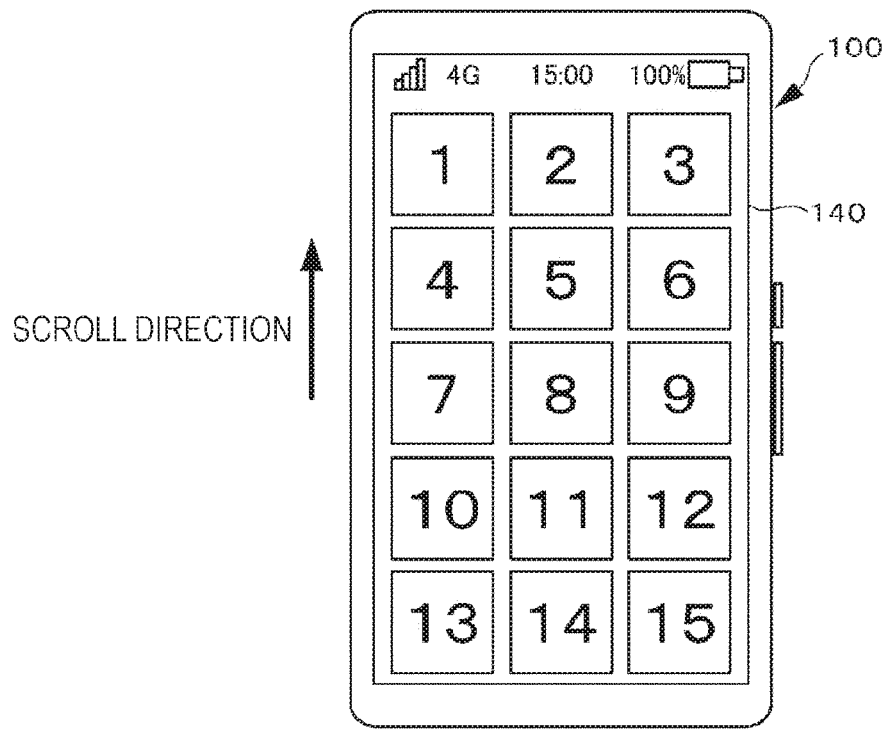
FIGS. 11A and 11B are explanatory views of thumbnail display.
Figure 11B:
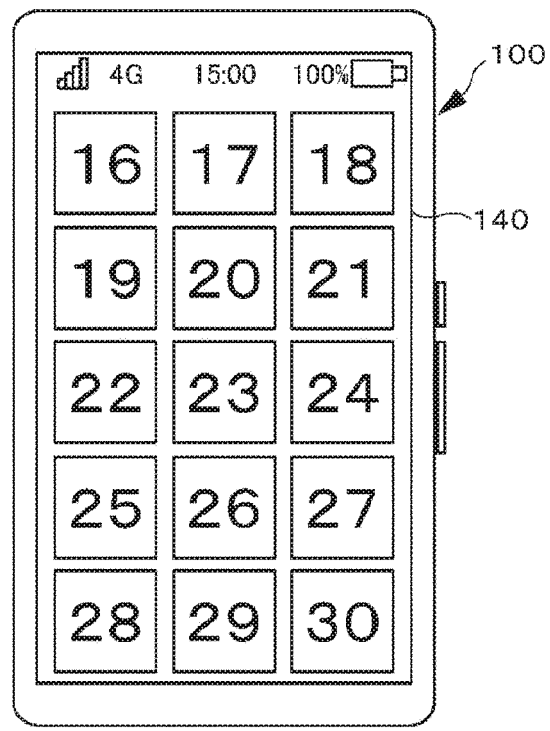

For example, as indicated by screen transition by scroll input from FIGS. 11A and 11B, the all image display threshold value may be 30, which is the maximum number of thumbnail image display of two screens. In a case where the all image display threshold value is equal to or more than the upper limit of thumbnail image display on one screen, as indicated by transition from FIGS. 11A and 11B, thumbnail images displayed by the user's screen scroll manipulation are changed. In FIG. 11A, 1st to 15th thumbnails are displayed and in FIG. 11B, 16th to 30th thumbnails are displayed.

Figure 12A:
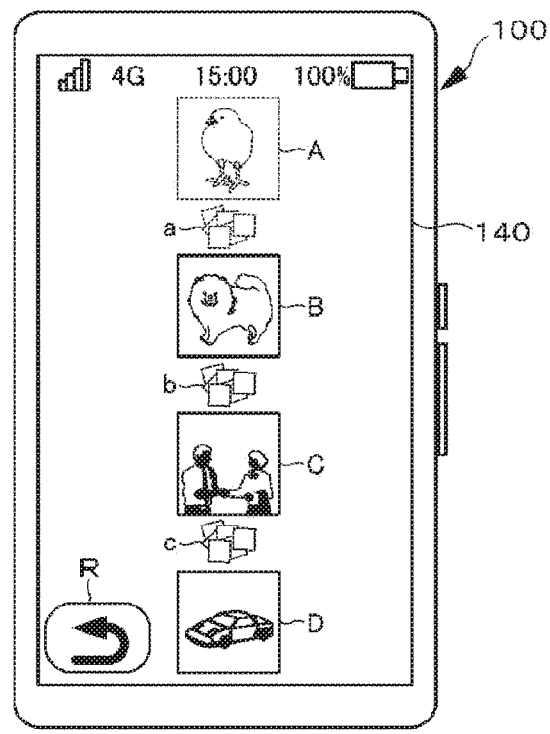
FIGS. 12A and 12B are views illustrating another example of an image search user interface.

In the aforementioned embodiment, the image excluded from the search target image group is described to be hidden on the display unit 140, but handling of the excluded image is not limited thereto. As illustrated in FIG. 12A, a representative image and an image group, which are images excluded from a search target image group, may be displayed on the display unit 140 in an aspect of being distinguishable from non-excluded images. In FIG. 12A, representative image A and image group a, which are excluded, are displayed by the thin dashed lines. The distinguishable aspect may be any aspect as long as distinguishing is possible, for example, thinly displaying by changing light and shade, displaying in a transparent state, changing color, or the like.

Figure 12B:
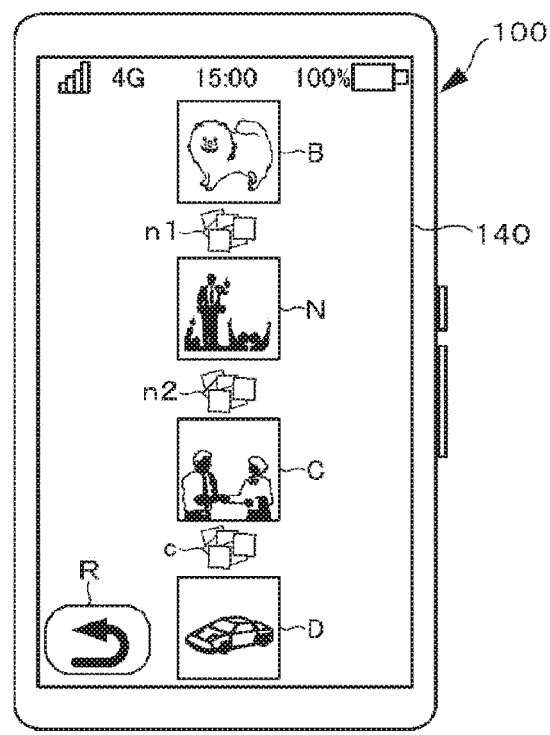

Furthermore, as illustrated in FIG. 12B, the images excluded from the search target image group (representative image A and image group a of FIG. 12A) may be hidden, a new representative image may be extracted from the non-excluded image group, the representative image may be displayed, and a plurality of images before and after the representative image may be displayed as a new image group. In FIG. 12B, a representative image N, and image groups n1 and n2 are newly displayed.

Note that the present technology has been described as not requiring input of search conditions in search of an image, which does not prohibit a combination use with input of image search conditions. Image narrowing (filtering) using any search conditions may be performed.

Examples of any search conditions for narrowing (filtering) include past search results, subject detection information, face detection information, position information, meta information used for capturing, information of date and time of capture/acquisition, tag information the user added to an image, focus information added to an image, and the like.

For example, in a case where information of date and time of capture/acquisition is used, when the user inputs specific date and time or period, images not falling within the input date and time or period are excluded with reference to date and time information associated with an image as EXIF information. Alternatively, images falling within the input date and time or period may be excluded. It is sufficient if the user can specify which to exclude.

Furthermore, in a case where face detection information is used, first, face detection processing is performed on all images of a search target image group, and a list of images including detected faces (one image per face) is displayed on the display unit 140 and presented to the user. Then, when one of the plurality of faces displayed is selected by the user, the images including unselected faces are excluded. Alternatively, images including selected faces may be excluded. It is sufficient if the user can specify which to exclude.

Furthermore, in a case where focus information during capturing is associated with an image, an image out of focus can be excluded such that only an image in focus is present in the search target image group.

This narrowing (filtering) may be performed prior to S11 in the flowchart of FIG. 2, i.e., prior to start of the display control processing. Furthermore, it may be performed between step S17 and step S21, i.e., prior to exclusion of images from a search target image group through input on the return button R. Furthermore, it may be performed between step S22 and step S11, i.e., after exclusion of images from a search target image group through input on the return button R.

Furthermore, publicly known image analysis processing is performed to sort a search target image group into groups in terms of date and time of image capture/acquisition, color distribution detection result, subject recognition result, or the like, one group is selected and the other groups are excluded, thereby narrowing (filtering) may be performed. When information such as date and time of image capture/acquisition, color distribution detection result, subject recognition result is used in combination to sort images into groups, it is possible to sort images into groups with respect to, for example, event (for example, travel, house party, or the like) and an intended image can be found therefrom.

Note that, for example, in a case where images are arranged in a search target image group in a predetermined order, which is image A, image B, image C . . . , in a case where an image A and an image C are extracted as representative images, an image group including an image B only is displayed between a representative image A and a representative image C.

2. Application Example

The technology according to the present disclosure is applicable to a variety of products. For example, the technology according to the present disclosure may be applied to a surgery room system.

Figure 13:
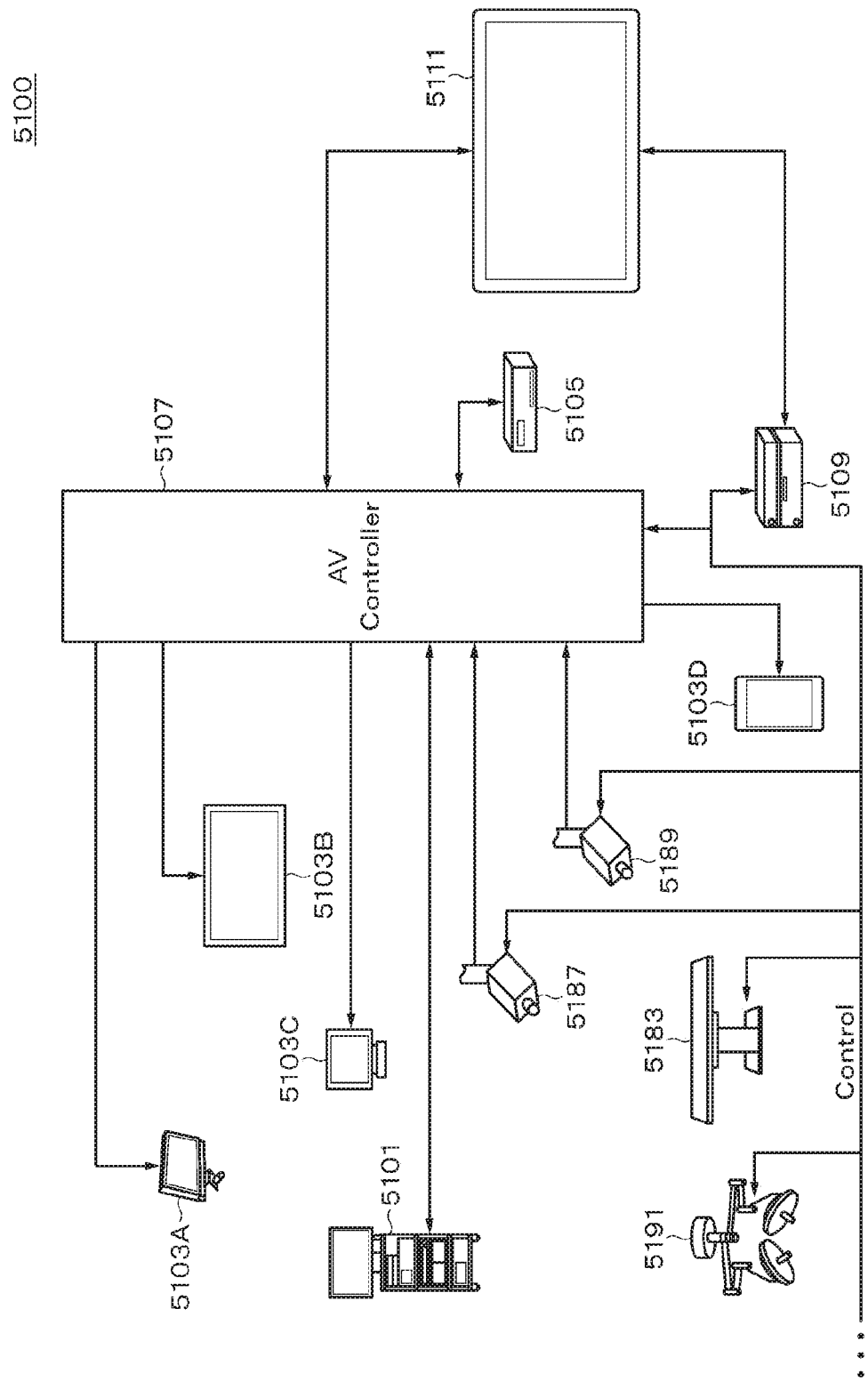
FIG. 13 is a diagram schematically illustrating the overall configuration of a surgery room system.

FIG. 13 is a diagram schematically illustrating the overall configuration of a surgery room system 5100 to which the technology according to the present disclosure can be applied. With reference to FIG. 13, the surgery room system 5100 is configured such that a device group installed in a surgery room is connected to be capable of cooperating with each other through an audiovisual controller (AV controller) 5107 and a surgery room control device 5109.

In the surgery room, various devices can be provided. In FIG. 13, as an example, various device groups 5101 for an endoscopic surgery, a ceiling camera 5187 which is disposed on the ceiling of the surgery room, and images the hands of a surgery operator, a surgery site camera 5189 which is disposed on the ceiling of the surgery room, and images the entire state of the surgery room, a plurality of display devices 5103A to 5103D, a recorder 5105, a patient bed 5183, and an illumination 5191, are illustrated.

Here, in such devices, the device group 5101 belongs to an endoscope surgery system 5113 as described later, and includes an endoscope, a display device displaying an image imaged by the endoscope, and the like. Each of the devices belonging to the endoscope surgery system 5113 is also referred to as medical equipment. On the other hand, the display devices 5103A to 5103D, the recorder 5105, the patient bed 5183, and the illumination 5191, for example, are a device provided in the surgery room, separately from the endoscope surgery system 5113. Each of the devices not belonging to the endoscope surgery system 5113, is also referred to as non-medical equipment. The audiovisual controller 5107 and/or the surgery room control device 5109, cooperatively control the operation of the medical equipment and the non-medical equipment.

The audiovisual controller 5107 integrally controls processing relevant to image display in the medical equipment and the non-medical equipment. Specifically, in the devices of the surgery room system 5100, the device group 5101, the ceiling camera 5187, and the surgery site camera 5189 can be a device having a function of transmitting information to be displayed during the surgery (hereinafter, also referred to as display information) (hereinafter, also referred to as a device of a transmission source). Furthermore, the display devices 5103A to 5103D can be a device to which the display information is output (hereinafter, also referred to as a device of an output destination). Furthermore, the recorder 5105 can be a device corresponding to both of the device of the transmission source and the device of the output destination. The audiovisual controller 5107 has a function of controlling the operation of the device of the transmission source and the device of the output destination, of acquiring the display information from the device of the transmission source, of transmitting the display information to the device of the output destination, and of displaying or recording the display information. Note that the display information is various images imaged during the surgery, various information items associated to the surgery (for example, body information of a patient, a test result of the past, information associated with a surgery method, or the like), and the like.

Specifically, information with respect to an image of a surgery portion in body cavity of the patient, which is imaged by the endoscope, can be transmitted to the audiovisual controller 5107 from the device group 5101, as the display information. Furthermore, information with respect to an image of the hands of the surgery operator, which is imaged by the ceiling camera 5187, can be transmitted from the ceiling camera 5187, as the display information. Furthermore, information with respect to an image indicating the entire state of the surgery room, which is imaged by the surgery site camera 5189, can be transmitted from the surgery site camera 5189, as the display information. Note that in a case where the other device having an imaging function exists in the surgery room system 5100, the audiovisual controller 5107 may acquire information with respect to an image imaged by the other device from the other device, as the display information.

Alternatively, for example, in the recorder 5105, the information with respect to the image imaged in the past is recorded by the audiovisual controller 5107. The audiovisual controller 5107 is capable of acquiring the information with respect to the image imaged in the past, from the recorder 5105, as the display information. Note that, in the recorder 5105, various information items associated to the surgery may be also recorded in advance.

The audiovisual controller 5107 displays the acquired display information (i.e., an image captured during the surgery or various information items associated to the surgery) on at least one of the display devices 5103A to 5103D, which are the device of the output destination. In the illustrated example, the display device 5103A is a display device disposed to be suspended from the ceiling of the surgery room, the display device 5103B is a display device disposed on a wall surface of the surgery room, the display device 5103C is a display device disposed on a desk in the surgery room, and the display device 5103D is mobile equipment having a display function (for example, a tablet personal computer (PC)).

Furthermore, even though it is not illustrated in FIG. 13, the surgery room system 5100 may include a device outside the surgery room. The device outside the surgery room, for example, can be a server connected to a network constructed inside or outside the hospital, or a PC used by a medical staff, a projector disposed in an assembly room of the hospital, and the like. In a case where such an external device is outside the hospital, the audiovisual controller 5107 is capable of displaying the display information on a display device of the other hospital through a teleconference system or the like, in order for a remote medical care.

The surgery room control device 5109 integrally controls processing other than the processing relevant to the image display in the non-medical equipment. For example, the surgery room control device 5109 controls the driving of the patient bed 5183, the ceiling camera 5187, the surgery site camera 5189, and the illumination 5191.

In the surgery room system 5100, a centralized manipulation panel 5111 is provided, a user is capable of giving an instruction with respect to the image display, to the audiovisual controller 5107, or of giving an instruction with respect to the operation of the non-medical equipment, to the surgery room control device 5109, through the centralized manipulation panel 5111. The centralized manipulation panel 5111 has a configuration in which a touch panel is disposed on a display surface of the display device.

Figure 14:
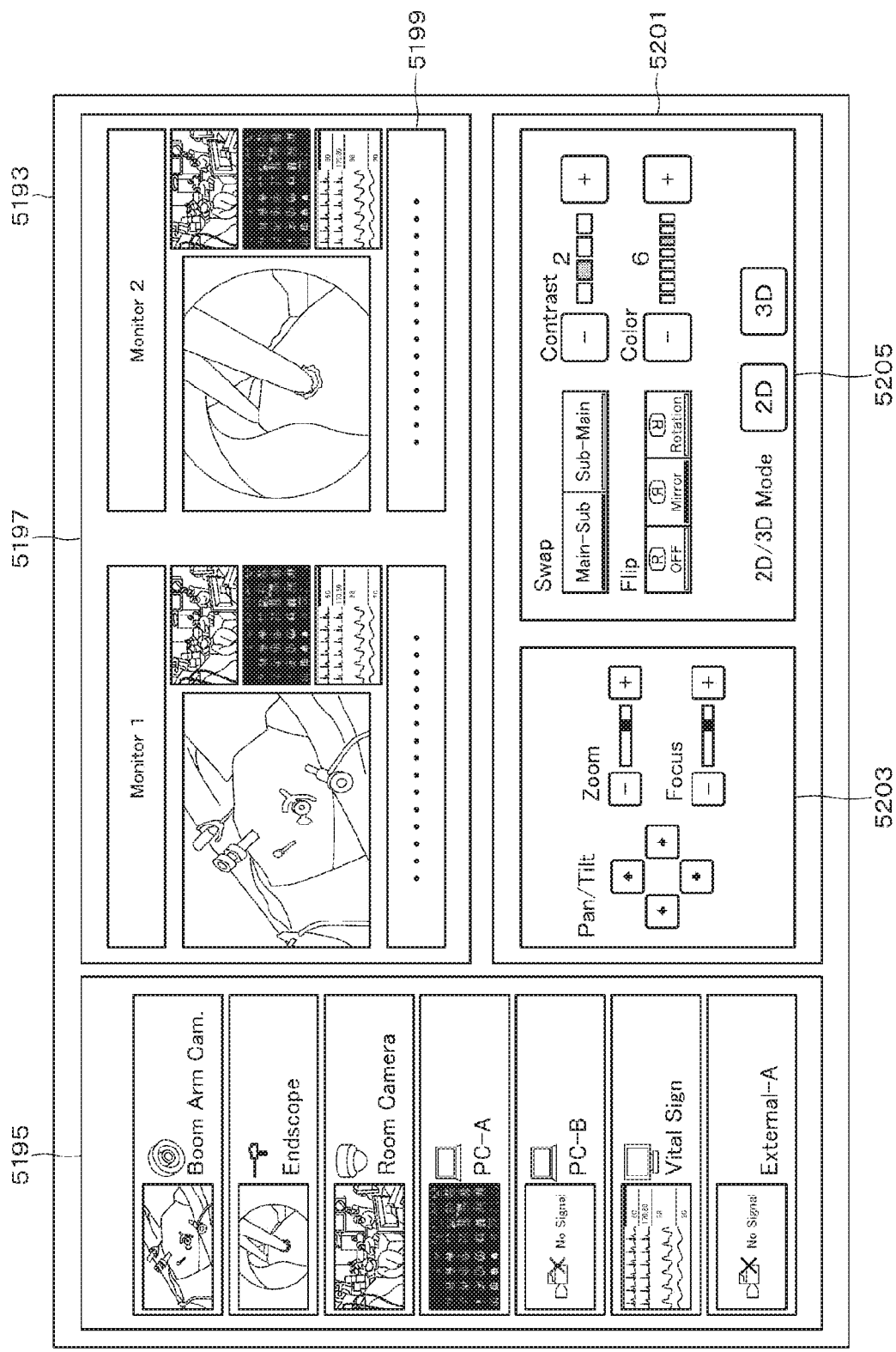
FIG. 14 is a diagram illustrating a display example of a manipulation screen on a centralized manipulation panel.

FIG. 14 is a diagram illustrating a display example of a manipulation screen of the centralized manipulation panel 5111. In FIG. 14, as an example, a manipulation screen corresponding to a case where two display devices are provided in the surgery room system 5100, as the device of the output destination, is illustrated. With reference to FIG. 14, in the manipulation screen 5193, a transmission source selection region 5195, a preview region 5197, and a control region 5201 are provided.

On the transmission source selection region 5195, a transmission source device provided in the surgery room system 5100, and a thumbnail screen indicating display information of the transmission source device, are displayed to be linked to each other. The user is capable of selecting the display information to be displayed on the display device, from any transmission source device displayed on the transmission source selection region 5195.

On the preview region 5197, a preview of a screen to be displayed on two display devices (Monitor 1 and Monitor 2), which are the device of the output destination, is displayed. In the illustrated example, four images are PinP-displayed on one display device. The four images correspond to the display information transmitted from the transmission source device selected in the transmission source selection region 5195. In four images, one image is displayed comparatively large as a main image, and the remaining three images are displayed comparatively small as a sub-image. The user suitably selects a region on which four images are displayed, and thus, is capable of switching the main image and the sub-image. Furthermore, in a lower portion of the region on which four images are displayed, a status display region 5199 is provided, and a status relevant to the surgery (for example, an elapsed time of the surgery, the body information of the patient, and the like) can be suitably displayed on the region.

In the control region 5201, a transmission source manipulation region 5203 on which a graphical user interface (GUI) component for performing a manipulation with respect to the device of the transmission source, is displayed, and an output destination manipulation region 5205 on which a GUI component for performing a manipulation with respect to the device of the output destination, is displayed, are provided. In the illustrated example, in the transmission source manipulation region 5203, a GUI component for performing various manipulations (pan, tilt, and zoom) with respect to a camera in the device of the transmission source, having an imaging function, is provided. The user suitably selects the GUI component, and thus, is capable of manipulating the operation of the camera in the device of the transmission source. Note that, even though it is not illustrated, in a case where the device of the transmission source, selected in the transmission source selection region 5195, is a recorder (i.e., in a case where the image recorded in the recorder in the past, is displayed on the preview region 5197), in the transmission source manipulation region 5203, a GUI component for performing a manipulation such as reproducing, stopping reproducing, rewinding, and fast forwarding of the image, can be provided.

Furthermore, in the output destination manipulation region 5205, a GUI component for performing various manipulations (swap, flip, tone adjustment, contrast adjustment, and switching between 2D display and 3D display) with respect to the display on the display device which is the device of the output destination, is provided. The user suitably selects such a GUI component, and thus, is capable of manipulating the display on the display device.

Note that the manipulation screen to be displayed on the centralized manipulation panel 5111 is not limited to the illustrated example, and the user may perform manipulation input with respect to each device, which is provided in the surgery room system 5100, and is capable of being controlled by the audiovisual controller 5107 and the surgery room control device 5109, through the centralized manipulation panel 5111.

Figure 15:
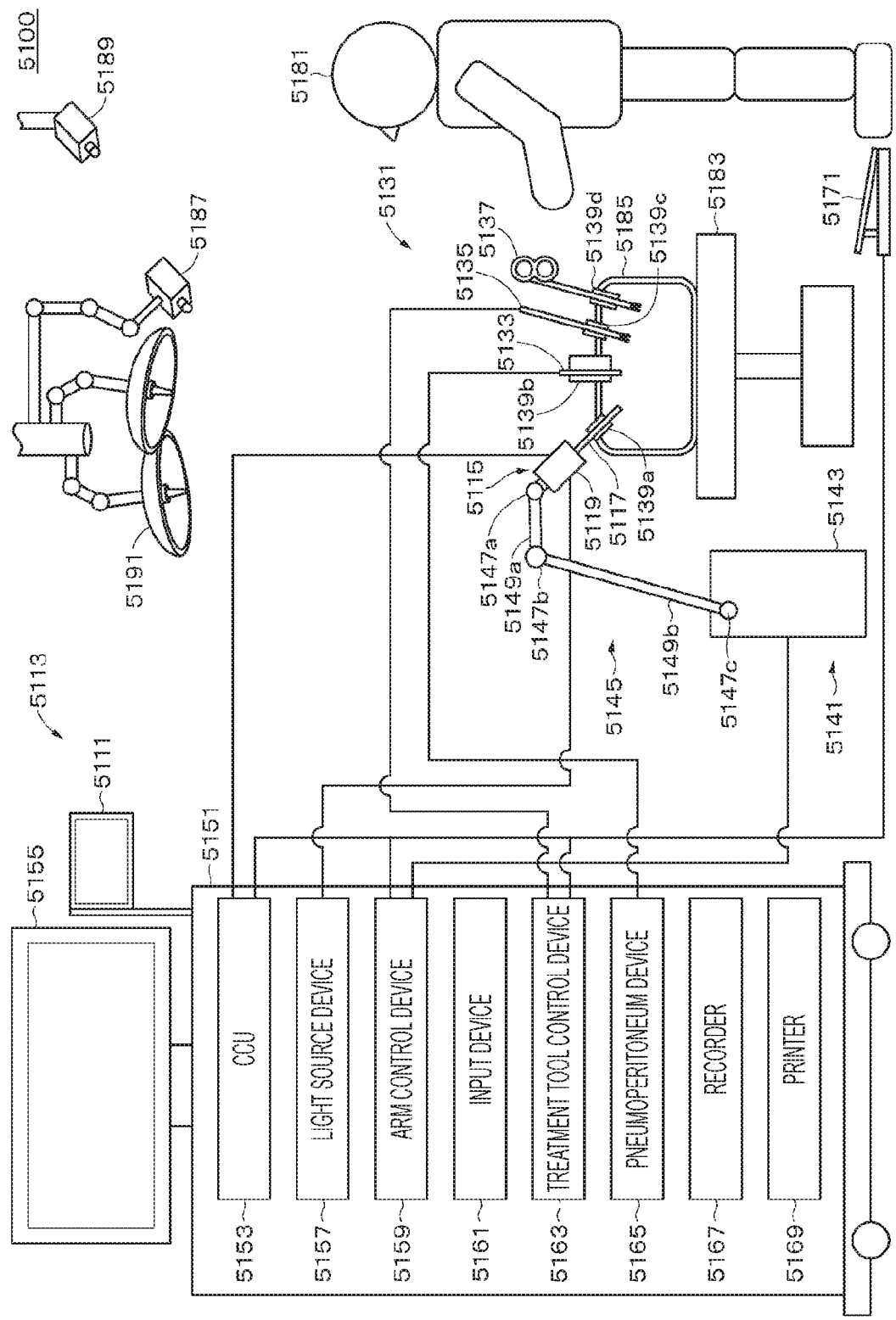
FIG. 15 is a diagram illustrating an example of a state of a surgery to which the surgery room system is applied.

FIG. 15 is a diagram illustrating an example of the state of the surgery to which the surgery room system described above is applied. The ceiling camera 5187 and the surgery site camera 5189 are disposed on the ceiling of the surgery room, and are capable of capturing the hands of a surgery operator (a medical doctor) 5181 performing a treatment with respect to an affected part of a patient 5185 on the patient bed 5183, and the entire state of the surgery room. In the ceiling camera 5187 and the surgery site camera 5189, a magnification adjustment function, a focal point distance adjustment function, a capturing direction adjustment function, and the like can be provided. The illumination 5191 is disposed on the ceiling of the surgery room, and irradiates at least the hands of the surgery operator 5181 with light. The illumination 5191 may suitably adjust an irradiation light amount, a wavelength (a color) of irradiation light, a light irradiation direction, and the like.

As illustrated in FIG. 13, the endoscope surgery system 5113, the patient bed 5183, the ceiling camera 5187, the surgery site camera 5189, and the illumination 5191 are connected to be capable of cooperating with each other, through the audiovisual controller 5107 and the surgery room control device 5109 (not illustrated in FIG. 15). In the surgery room, the centralized manipulation panel 5111 is provided, and as described above, the user is capable of suitably manipulating the devices existing in the surgery room, through the centralized manipulation panel 5111.

Hereinafter, the configuration of the endoscope surgery system 5113 will be described in detail. As illustrated, the endoscope surgery system 5113 includes an endoscope 5115, other surgical tools 5131, a support arm device 5141 supporting the endoscope 5115, and a cart 5151 on which various devices for an endoscopic surgery are mounted.

In the endoscope surgery, a plurality of tubular perforating tools referred to as trocars 5139a to 5139d, is punctured on an abdominal wall, instead of performing laparotomy by cutting the abdominal wall. Then, a lens tube 5117 of the endoscope 5115, and the other surgical tools 5131 are inserted into the body cavity of the patient 5185, from the trocars 5139a to 5139d. In the illustrated example, as the other surgical tools 5131, a pneumoperitoneum tube 5133, an energy treatment tool 5135, and forceps 5137 are inserted into the body cavity of the patient 5185. Furthermore, the energy treatment tool 5135 is a treatment tool performing incision and ablation of a tissue, sealing of a blood vessel, and the like, according to a high frequency current or an ultrasonic vibration. Here, the illustrated surgical tool 5131 is merely an example, and for example, various surgical tools generally used in the endoscopic surgery, such as tweezers and a retractor, may be used as the surgical tool 5131.

The image of the surgery portion in the body cavity of the patient 5185, captured by the endoscope 5115, is displayed on the display device 5155. The surgery operator 5181, for example, performs a treatment such as excision of the affected part by using the energy treatment tool 5135 or the forceps 5137, while observing the image of the surgery portion displayed on the display device 5155, in real time. Note that, even though it is not illustrated, the pneumoperitoneum tube 5133, the energy treatment tool 5135, and the forceps 5137 are supported by the surgery operator 5181, an assistant, or the like, during the surgery.

(Support Arm Device)

The support arm device 5141 includes an arm portion 5145 extending from a base portion 5143. In the illustrated example, the arm portion 5145 includes joint portions 5147*a*, 5147*b*, and 5147*c*, and links 5149*a* and 5149*b*, and is driven according to the control from the arm control device 5159. The endoscope 5115 is supported by the arm portion 5145, and the position and the posture thereof are controlled. With this arrangement, a stable position of the endoscope 5115 can be fixed.

(Endoscope)

The endoscope 5115 includes a lens tube 5117 in which a region of a predetermined length from a tip end, is inserted into the body cavity of the patient 5185, and a camera head 5119 connected to a base end of the lens tube 5117. In the illustrated example, the endoscope 5115 configured as a so-called rigid scope including a rigid lens tube 5117, is illustrated, but the endoscope 5115 may be configured as a so-called flexible scope including a flexible lens tube 5117.

An opening portion into which an objective lens is fitted, is provided on the tip end of the lens tube 5117. A light source device 5157 is connected to the endoscope 5115, and light generated by the light source device 5157 is guided to the tip end of the lens tube by a light guide provided to extend in the lens tube 5117, and is applied towards an observation target in the body cavity of the patient 5185 through the objective lens. Note that the endoscope 5115 may be a forward-viewing endoscope, or may be an oblique-viewing endoscope or a side-viewing endoscope.

In the camera head 5119, an optical system and an imaging element are provided, and reflection light (observation light) from the observation target, is condensed in the imaging element by the optical system. The observation light is subjected to the photoelectric conversion by the imaging element, and an electrical signal corresponding to the observation light, that is, an image signal corresponding to an observation image, is generated. The image signal is transmitted to a camera control unit (CCU) 5153, as RAW data. Note that in the camera head 5119, a function of adjusting a magnification and a focal point distance by suitably driving the optical system, is provided.

Note that, for example, a plurality of imaging elements may be provided in the camera head 5119, in order to correspond to a stereoscopic view (3D display) or the like. In this case, a plurality of relay optical systems is provided in the lens tube 5117, in order to guide the observation light to each of the plurality of imaging elements.

(Various Devices Mounted on Cart)

The CCU 5153 includes a central processing unit (CPU), a graphics processing unit (GPU), or the like, and integrally controls the operation of the endoscope 5115 and the display device 5155. Specifically, the CCU 5153 performs, for example, various image processing for displaying the image based on the image signal, such as development processing (demosaic processing), on the image signal received from the camera head 5119. The CCU 5153 provides the image signal subjected to the image processing, to the display device 5155. Furthermore, the audiovisual controller 5107 illustrated in FIG. 13, is connected to the CCU 5153. The CCU 5153 also provides the image signal subjected to the image processing, to the audiovisual controller 5107. Furthermore, the CCU 5153 transmits a control signal to the camera head 5119, and controls the driving thereof. The control signal is capable of including information associated with an imaging condition such as a magnification or a focal point distance. The information associated with the imaging condition, may be input through an input device 5161, or may be input through the centralized manipulation panel 5111 described above.

The display device 5155 displays an image based on the image signal subjected to the image processing by the CCU 5153, according to the control from the CCU 5153. In a case where the endoscope 5115, for example, corresponds to high-definition capturing such as 4 K (the number of horizontal pixels of 3840×the number of vertical pixels of 2160) or 8 K (the number of horizontal pixels of 7680×the number of vertical pixels of 4320), and/or corresponds to 3D display, a display device capable of performing high-definition display corresponding to each of 4 K and 8 K, and/or a display device capable of performing 3D display, can be used as the display device 5155. In the case of corresponding to the high-definition capturing such as 4 K or 8 K, a display device having a size of greater than or equal to 55 inches is used as the display device 5155, and thus, more immersion feeling can be obtained. Furthermore, a plurality of display devices 5155 having different definitions and sizes may be provided, according to a use application.

The light source device 5157, for example, includes a light source such as a light emitting diode (LED), and supplies the irradiation light at the time of capturing the surgery portion, to the endoscope 5115.

The arm control device 5159, for example, includes a processor such as a CPU, and is operated according to a predetermined program, and thus, controls the driving of the arm portion 5145 of the support arm device 5141, according to a predetermined control method.

The input device 5161 is an input interface with respect to the endoscope surgery system 5113. The user is capable of performing the input of various information items, or the input of an instruction with respect to endoscope surgery system 5113, through the input device 5161. For example, the user inputs various information items associated with the surgery, such as the body information of the patient, and the information associated to the surgery method of the surgery, through the input device 5161. Furthermore, for example, the user inputs an instruction of driving the arm portion 5145, an instruction of changing the imaging condition of the endoscope 5115 (the type of irradiation light, the magnification, the focal point distance, and the like), an instruction of driving the energy treatment tool 5135, and the like, through the input device 5161.

The type of input device 5161 is not limited, and the input device 5161 may be various known input devices. For example, a mouse, a keyboard, a touch panel, a switch, a foot switch 5171 and/or a lever, and the like can be applied as the input device 5161. In a case where the touch panel is used as the input device 5161, the touch panel may be disposed on the display surface of the display device 5155.

Alternatively, the input device 5161, for example, is a device mounted on the user, such as a glasses type wearable device or a head mounted display (HMD), various inputs are performed according to the gesture or a line-of-sight of the user, which is detected by such a device. Furthermore, the input device 5161 includes a camera capable of detecting the motion of the user, and various inputs are performed according to the gesture or the line-of-sight of the user detected from a video imaged by the camera. Moreover, the input device 5161 includes a microphone capable of picking up the voice of the user, and various inputs are performed according to the sound through the microphone. Thus, the input device 5161 is configured such that various information items can be input in a non-contact manner, and thus, in particular, a user belonging to a clean area (for example, the surgery operator 5181) is capable of manipulating the equipment belonging to an unclean area, in a non-contact manner. Furthermore, the user is capable of manipulating the equipment without releasing the hands from the possessed surgical tool, and thus, convenience of the user is improved.

The treatment tool control device 5163 controls the driving of the energy treatment tool 5135 for the cauterization and the incision of the tissue, the sealing of the blood vessel, or the like. In order to ensure a visual field of the endoscope 5115 and to ensure a working space of the surgery operator, the pneumoperitoneum device 5165 sends gas into the body cavity through the pneumoperitoneum tube 5133 such that the body cavity of the patient 5185 is inflated. The recorder 5167 is a device capable of recording various information items associated with the surgery. The printer 5169 is a device capable of printing various information items associated with the surgery, in various formats such as a text, an image, or a graph.

Hereinafter, in the endoscope surgery system 5113, a particularly characteristic configuration will be described in more detail.

(Support Arm Device)

The support arm device 5141 includes the base portion 5143 which is a base, and the arm portion 5145 extending from the base portion 5143. In the illustrated example, the arm portion 5145 includes the plurality of joint portions 5147*a*, 5147*b*, and 5147*c*, and the plurality of links 5149*a* and 5149*b* joined by the joint portion 5147*b*, but in FIG. 15, for the sake of simplicity, the configuration of the arm portion 5145 is simply illustrated. Actually, the shape of the joint portions 5147*a* to 5147*c* and the links 5149*a* and 5149*b*, the number of joint portions 5147*a* to 5147*c* and links 5149*a* and 5149*b*, the arrange of the joint portions 5147*a* to 5147*c* and the links 5149*a* and 5149*b*, a rotation axis direction of the joint portions 5147*a* to 5147*c*, and the like are suitably set such that the arm portion 5145 has a desired freedom degree. For example, the arm portion 5145 can be preferably configured to have a freedom degree of greater than or equal to six. With this arrangement, the endoscope 5115 can be freely moved within a movement range of the arm portion 5145, and thus, it is possible to insert the lens tube 5117 of the endoscope 5115 into the body cavity of the patient 5185 from a desired direction.

In the joint portions 5147*a* to 5147*c*, an actuator is provided, and the joint portions 5147*a* to 5147*c* can be rotated around a predetermined rotation axis by driving the actuator. The driving of the actuator is controlled by the arm control device 5159, and thus, a rotation angle of each of the joint portions 5147*a* to 5147*c* is controlled, and the driving of the arm portion 5145 is controlled. With this arrangement, the position and the posture of the endoscope 5115 can be controlled. At this time, the arm control device 5159 is capable of controlling the driving of the arm portion 5145, according to various known control methods such as force control or position control.

For example, the surgery operator 5181 performs suitable manipulation input through the input device 5161 (including the foot switch 5171), and thus, the driving of the arm portion 5145 may be suitably controlled by the arm control device 5159, according to the manipulation input, and the position and the posture of the endoscope 5115 may be controlled. According to the control, the endoscope 5115 on the tip end of the arm portion 5145, can be moved to an arbitrary position from an arbitrary position, and then, can be fixedly supported in the position after the movement. Note that the arm portion 5145 may be manipulated by a so-called master-slave system. In this case, the arm portion 5145 can be remotely manipulated by the user, through the input device 5161 provided in a location separated from the surgery room.

Furthermore, in a case where the force control is applied, so-called power assist control may be performed, in which the arm control device 5159 receives an external force from the user, and drives the actuator of each of the joint portions 5147*a* to 5147*c* such that the arm portion 5145 is smoothly moved according to the external force. With this arrangement, when the user moves the arm portion 5145 while directly touching the arm portion 5145, it is possible to move the arm portion 5145 with a comparatively light force. Accordingly, it is possible to more intuitively move the endoscope 5115 by a simpler manipulation, and to improve the convenience of the user.

Here, in general, in the endoscopic surgery, the endoscope 5115 is supported by a medical doctor referred to as a scopist. In contrast, the position of the endoscope 5115 can be more reliably fixed by using the support arm device 5141, without manual work, and thus, it is possible to stably obtain the image of the surgery portion, and to smoothly perform the surgery.

Note that the arm control device 5159 may not be necessarily provided in the cart 5151. Furthermore, the arm control device 5159 may not be necessarily one device. For example, the arm control device 5159 may be provided in each of the joint portions 5147*a* to 5147*c* of the arm portion 5145 of the support arm device 5141, and a plurality of arm control devices 5159 may cooperate with each other, and thus, the driving control of the arm portion 5145 may be realized.

(Light Source Device)

The light source device 5157 supplies the irradiation light at the time of capturing the surgery portion, to the endoscope 5115. The light source device 5157, for example, includes a white light source including an LED, a laser light source, or a combination thereof. At this time, in a case where the white light source includes a combination of RGB laser light sources, it is possible to control an output intensity and an output timing of each color (each wavelength) with a high accuracy, and thus, it is possible to adjust a white balance of the imaged image in the light source device 5157. Furthermore, in this case, laser light from each of the RGB laser light sources is applied to the observation target in time division, and the driving of the imaging element of the camera head 5119 is controlled in synchronization with the irradiation timing, and thus, it is also possible to image an image corresponding to each of RGB in time division. According to such a method, it is possible to obtain a color image without providing a color filter in the imaging element.

Furthermore, the driving of the light source device 5157 may be controlled such that the intensity of the light to be output is changed for each predetermined time. The driving of the imaging element of the camera head 5119 is controlled in synchronization with a timing when the intensity of the light is changed, images are acquired in time division, and the images are synthesized, and thus, it is possible to generate an image of a high dynamic range, without so-called black defects and overexposure.

Furthermore, the light source device 5157 may be configured to supply light of a predetermined wavelength band corresponding to special light imaging. In the special light imaging, for example, light of a narrow band is applied, compared to irradiation light at the time of performing usual observation by using wavelength dependency of absorbing light in the body tissue (i.e., white light), and thus, so-called narrow band imaging of capturing a predetermined tissue of a blood vessel or the like in a superficial portion of a mucous membrane with a high contrast, is performed. Alternatively, in the special light imaging, fluorescent light imaging of obtaining an image by fluorescent light generated by being irradiated with excited light, may be performed. In the fluorescent light imaging, for example, the body tissue is irradiated with the excited light, and the fluorescent light from the body tissue is observed (autofluorescent light imaging), or a reagent such as indian cyanine green (ICG) is locally injected into the body tissue, and the body tissue is irradiated with excited light corresponding to a fluorescent light wavelength of the reagent, and thus, a fluorescent image is obtained. The light source device 5157 can be configured to supply the narrow band light and/or the excited light corresponding to such special light imaging.

(Camera Head and CCU)

Figure 16:
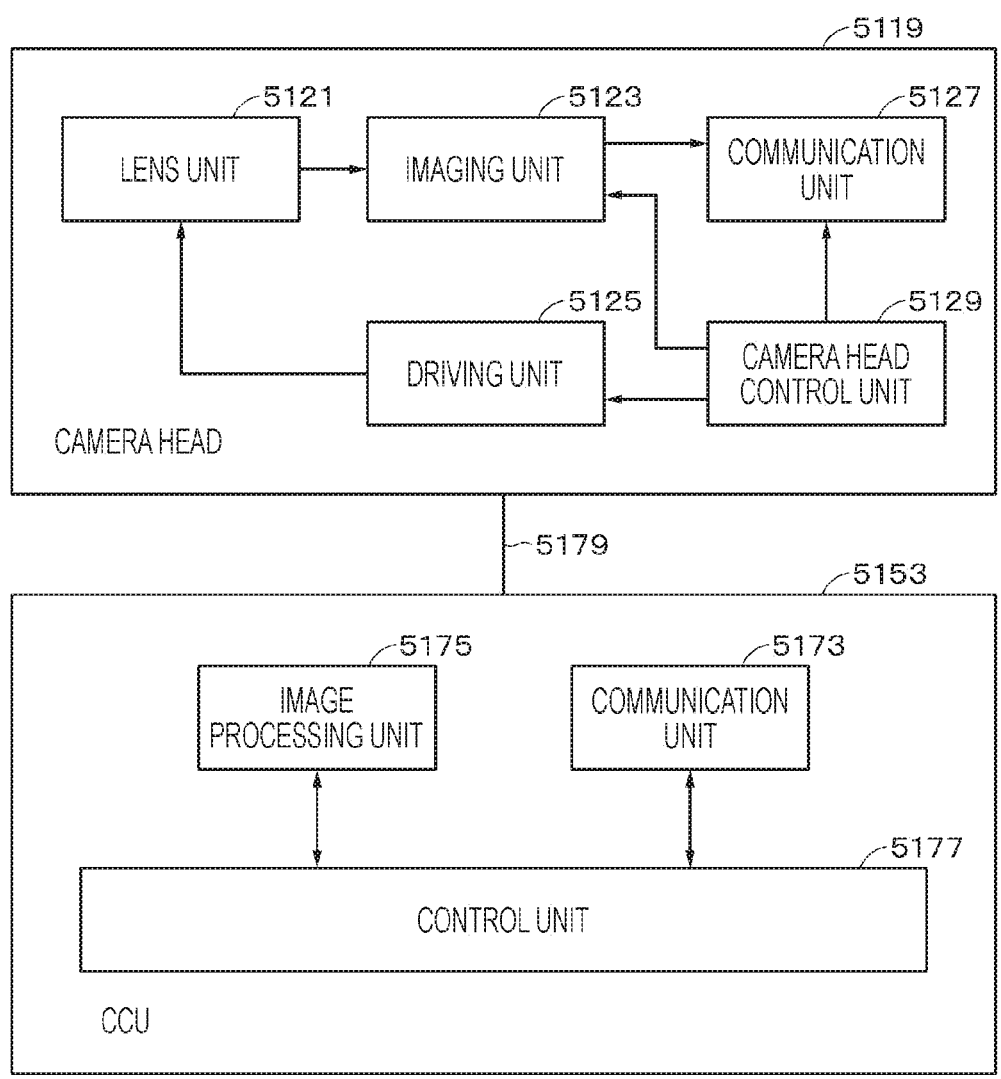
FIG. 16 is a block diagram illustrating an example of a functional configuration of a camera head and a CCU illustrated in FIG. 15.

The function of the camera head 5119 and the CCU 5153 of the endoscope 5115 will be described in more detail, with reference to FIG. 16. FIG. 16 is a block diagram illustrating an example of a functional configuration of the camera head 5119 and the CCU 5153 illustrated in FIG. 15.

With reference to FIG. 16, the camera head 5119 includes a lens unit 5121, an imaging unit 5123, a driving unit 5125, a communication unit 5127, and a camera head control unit 5129, as the function thereof. Furthermore, the CCU 5153 includes a communication unit 5173, an image processing unit 5175, and a control unit 5177, as the function thereof. The camera head 5119 and the CCU 5153 are connected to be capable of bidirectionally communicating with each other through a transmission cable 5179.

First, the functional configuration of the camera head 5119 will be described. The lens unit 5121 is an optical system provided in a connection portion with the lens tube 5117. Observation light incorporated from a tip end of the lens tube 5117, is guided to the camera head 5119, and is incident on the lens unit 5121. The lens unit 5121 includes a combination of a plurality of lenses including a zoom lens and a focus lens. Optical characteristics of the lens unit 5121 are adjusted such that the observation light is condensed on a light receiving surface of an imaging element of the imaging unit 5123. Furthermore, the zoom lens and the focus lens are configured such that the positions of the zoom lens and the focus lens on an optical axis can be moved in order to adjust the magnification and a focal point of the imaged image.

The imaging unit 5123 includes an imaging element, and is arranged on the later stage of the lens unit 5121. The observation light passing through the lens unit 5121, is condensed on the light receiving surface of the imaging element, and an image signal corresponding to the observation image is generated by the photoelectric conversion. The image signal generated by the imaging unit 5123, is provided to the communication unit 5127.

For example, a complementary metal oxide semiconductor (CMOS) type image sensor, which is capable of performing color capturing having a Bayer array, is used as the imaging element configuring the imaging unit 5123. Note that, for example, an element capable of corresponding to high-definition image capturing of greater than or equal to 4 K, may be used as the imaging element. The image of the surgery portion is obtained with a high definition, and thus, the surgery operator 5181 is capable of more specifically grasping the state of the surgery portion, and the surgery is capable of smoothly progressing.

Furthermore, the imaging element configuring the imaging unit 5123 includes a pair of imaging elements for acquiring each of an image signal for a right eye and an image signal for a left eye, corresponding to the 3D display. The 3D display is performed, and thus, the surgery operator 5181 is capable of more accurately grasping the depth of the biological tissue in the surgery portion. Note that, in a case where the imaging unit 5123 has a multi-plate type configuration, a plurality of lens units 5121 is provided corresponding to each of the imaging elements.

Furthermore, the imaging unit 5123 may not be necessarily provided in the camera head 5119. For example, the imaging unit 5123 may be provided immediately after the objective lens, in the lens tube 5117.

The driving unit 5125 includes an actuator, and moves the zoom lens and the focus lens of the lens unit 5121 along the optical axis by a predetermined distance, according to the control from the camera head control unit 5129. With this arrangement, it is possible to suitably adjust the magnification and the focal point of the image imaged by the imaging unit 5123.

The communication unit 5127 includes a communication device for transmitting and receiving various information items with respect to the CCU 5153. The communication unit 5127 transmits the image signal obtained from the imaging unit 5123 to the CCU 5153 through the transmission cable 5179, as the RAW data. At this time, in order to display the imaged image of the surgery portion with a low latency, it is preferable that the image signal is transmitted through optical communication. This is because at the time of the surgery, the surgery operator 5181 performs the surgery while observing the state of the affected part by the imaged image, and thus, in order for a more secure and reliable surgery, a moving image of the surgery portion is required to be displayed in real time to the maximum extent. In a case where the optical communication is performed, in the communication unit 5127, a photoelectric conversion module converting an electrical signal into an optical signal, is provided. The image signal is converted into the optical signal by the photoelectric conversion module, and then, is transmitted to the CCU 5153 through the transmission cable 5179.

Furthermore, the communication unit 5127 receives a control signal for controlling the driving of the camera head 5119, from the CCU 5153. The control signal, for example, includes information associated with the imaging condition, such as information of designating a frame rate of the imaged image, information of designating an exposure value at the time of the imaging, and/or information of designating the magnification and the focal point of the imaged image. The communication unit 5127 provides the received control signal to the camera head control unit 5129. Note that the control signal from the CCU 5153 may be transmitted through the optical communication. In this case, in the communication unit 5127, a photoelectric conversion module converting the optical signal into an electrical signal, is provided, and the control signal is converted into the electrical signal by the photoelectric conversion module, and then, is provided to the camera head control unit 5129.

Note that the imaging condition such as the frame rate or the exposure value, the magnification, and the focal point, described above, is automatically set by the control unit 5177 of the CCU 5153, on the basis of the acquired image signal. That is, a so-called auto exposure (AE) function, an auto focus (AF) function, and an auto white balance (AWB) function are provided in the endoscope 5115.

The camera head control unit 5129 controls the driving of the camera head 5119, on the basis of the control signal from the CCU 5153 received through the communication unit 5127. For example, the camera head control unit 5129 controls the driving of the imaging element of the imaging unit 5123, on the basis of the information of designating the frame rate of the imaged image and/or the information of designating the exposure at the time of the imaging. Furthermore, for example, the camera head control unit 5129 suitably moves the zoom lens and the focus lens of the lens unit 5121 through the driving unit 5125, on the basis of the information of designating the magnification and the focal point of the imaged image. Moreover, the camera head control unit 5129 may have a function of storing information for identifying the lens tube 5117 or the camera head 5119.

Note that the lens unit 5121, the imaging unit 5123, and the like, are arranged in a sealed structure having high airtightness and waterproof properties, and thus, it is possible for the camera head 5119 to have resistance with respect to an autoclave sterilization treatment.

Next, the functional configuration of the CCU 5153 will be described. The communication unit 5173 includes a communication device for transmitting and receiving various information items with respect to the camera head 5119. The communication unit 5173 receives the image signal to be transmitted from the camera head 5119, through the transmission cable 5179. At this time, as described above, the image signal can be preferably transmitted through optical communication. In this case, in the communication unit 5173, a photoelectric conversion module converting an optical signal into an electrical signal, is provided corresponding to the optical communication. The communication unit 5173 provides the image signal converted into the electrical signal, to the image processing unit 5175.

Furthermore, the communication unit 5173 transmits the control signal for controlling the driving of the camera head 5119, to the camera head 5119. The control signal may be transmitted through the optical communication.

The image processing unit 5175 performs various image processing on the image signal which is the RAW data transmitted from the camera head 5119. For example, various known signal processing such as development processing, high-image quality processing (band emphasizing processing, super-resolution processing, noise reduction (NR) processing and/or shake correction processing, or the like), and/or magnification processing (electron zoom processing), are included as the image processing. Furthermore, the image processing unit 5175 performs detection processing on the image signal, in order to perform AE, AF, and AWB.

The image processing unit 5175 includes a processor such as a CPU or a GPU, and the processor is operated according to a predetermined program, and thus, the image processing or the detection processing, described above, can be performed. Note that, in a case where the image processing unit 5175 includes a plurality of GPUs, the image processing unit 5175 suitably divides information associated with the image signal, and performs the image processing in parallel, by the plurality of GPUs.

The control unit 5177 performs various controls relevant to the imaging of the surgery portion by the endoscope 5115, and the display of the imaged image. For example, the control unit 5177 generates the control signal for controlling the driving of the camera head 5119. At this time, in a case where the imaging condition is input by the user, the control unit 5177 generates the control signal on the basis of the input of the user. Alternatively, in a case where the AE function, the AF function, and the AWB function are provided in the endoscope 5115, the control unit 5177 suitably calculates an optimal exposure value, a focal point distance, and a white balance, according to the result of the detection processing by the image processing unit 5175, and generates the control signal.

Furthermore, the control unit 5177 displays the image of the surgery portion on the display device 5155, on the basis of the image signal subjected to the image processing by the image processing unit 5175. At this time, the control unit 5177 recognizes various objects in the surgery portion image, by using various image recognition technologies. For example, the control unit 5177 detects the shape, the color, or the like of the edge of the object included in the surgery portion image, and thus, it is possible to recognize a surgical tool such as forceps, a specific biological portion, bleed, mist at the time of using the energy treatment tool 5135, and the like When the image of the surgery portion is displayed on the display device 5155, the control unit 5177 displays various surgery support information items to be superimposed on the image of the surgery portion, by using a recognition result. The surgery support information is displayed to be superimposed, and is presented to the surgery operator 5181, and thus, a more secure and reliable surgery is capable of progressing.

The transmission cable 5179 connecting the camera head 5119 and the CCU 5153 together, is an electrical signal cable corresponding to the communication of the electrical signal, an optical fiber corresponding to the optical communication, or a composite cable thereof.

Here, in the illustrated example, the communication is performed in a wired manner, by using the transmission cable 5179, but the communication between the camera head 5119 and the CCU 5153, may be performed in a wireless manner. In a case where the communication between the camera head 5119 and the CCU 5153 is performed in a wireless manner, it is not necessary that the transmission cable 5179 is laid in the surgery room, and thus, a problem can be solved, in which the movement of the medical staff in the surgery room is hindered by the transmission cable 5179.

An example of the surgery room system 5100 to which the technology according to the present disclosure can be applied, has been described. Note that, here, a case where the medical system to which the surgery room system 5100 is applied, is the endoscope surgery system 5113, has been described as an example, but the configuration of the surgery room system 5100 is not limited to such an example. For example, the surgery room system 5100 may be applied to a flexible endoscope system for a test or a microscope surgery system, instead of the endoscope surgery system 5113.

The technology according to the present disclosure can be used in the application examples described above in a case where an image of surgery captured during surgery is transferred and saved in a personal computer, a tablet terminal, or the like and the image is searched.

3. Variation

Heretofore, the embodiments of the present technology have been described in detail, but the present technology is not limited to the aforementioned embodiments, but various modifications based on the technical idea of the present technology may be made.

In the embodiment, a description is given of the case where the terminal apparatus is a smartphone. However, the terminal apparatus may be a tablet terminal, a personal computer, a mobile game machine, a wearable terminal, a digital camera, or the like. It is applicable to any apparatus including a display unit, a storage unit (external storage unit is possible) and having a function of displaying an image saved in the storage unit.

The present technology may be configured as follows.

(1) A display control apparatus including:
a control unit that performs control of displaying a plurality of representative images extracted from a search target image group, and image group information that indicates presence of an image other than the representative images in the search target image group and is displayed in a form different from the representative images between a plurality of the representative images.

(2) The display control apparatus according to (1), in which the representative image is an image spaced away in an image arrangement order in the search target image group.

(3) The display control apparatus according to (1) or (2), in which the representative image and the image group information are alternately arranged and displayed on the display unit.

(4) The display control apparatus according to any of (1) to (3), in which the image group information indicates that an image other than the representative image is present along a predetermined order between a plurality of the representative images in the search target image group in which the image is saved in the predetermined order.

(5) The display control apparatus according to any of (1) to (4), in which upon a user's input to select one representative image of a plurality of the representative images displayed on the display unit, only the one representative image is displayed on the display unit.

(6) The display control apparatus according to any of (1) to (5), in which upon a user's input to select the image group information displayed on the display unit, a representative image is extracted from an image group corresponding to the input image group information and is displayed on the display unit.

(7) The display control apparatus according to (6), in which an image other than the representative image extracted from the image group corresponding to the input image group information is displayed on the display unit as the image group information.

(8) The display control apparatus according to (6), in which, when input to select the image group information displayed on the display unit is made and then input to give an instruction of canceling selection is made, the image corresponding to the selected image group information is excluded from the search target image group.

(9) The display control apparatus according to (8), in which, when the number of images in the search target image group is equal to or less than a predetermined number, all images in the search target image group are thumbnail-displayed on the display unit.

(10) The display control apparatus according to any of (1) to (10), in which, regarding the representative image, the search target image group is sorted into a plurality of groups, and the representative image is extracted with respect to each of the plurality of groups.

(11) The display control apparatus according to any of (1) to (10), in which the representative image is an image to which a user has added tag information.

(12) The display control apparatus according to any of (1) to (10), in which the representative image is an image on which a user has performed predetermined image processing.

(13) The display control apparatus according to any of (1) to (10), in which the representative image is an image that has previously been displayed on the display unit for predetermined time or more.

(14) The display control apparatus according to any of (1) to (10), in which the representative image is an image that has previously been displayed on the display unit a predetermined number of times or more.

(15) The display control apparatus according to any of (1) to (10), in which the representative image is an image having color information of a predetermined value or more.

(16) A display control method for performing control of displaying a plurality of representative images extracted from a search target image group, and image group information that indicates presence of an image other than the representative images in the search target image group and is displayed in a form different from the representative images between a plurality of the representative images.

(17) A display control program causing a computer to execute a display control method for performing control of displaying a plurality of representative images extracted from a search target image group, and image group information that indicates presence of an image other than the representative images in the search target image group and is displayed in a form different from the representative images between a plurality of the representative images.

REFERENCE SIGNS LIST

140 Display unit
160 Display control unit

The invention claimed is:

1. A display control apparatus, comprising:
a central processing unit (CPU) configured to:
extract a plurality of representative images from a search target image group;
control a display screen to display:
the plurality of representative images extracted from the search target image group, and
image group information, wherein
the image group information indicates presence of an image other than the plurality of representative images in the search target image group,
the image group information is displayed between the plurality of representative images, and
the image group information is displayed in a form different from the plurality of the representative images;
receive a first user input to select the image group information displayed on the display screen;
extract a representative image from an image group corresponding to the selected image group information;
control the display screen to display the extracted representative image;
receive a second user input to cancel the selection of the image group information displayed on the display screen; and
exclude an image corresponding to the selected image group information from the search target image group based on the received second user input to cancel the selection of the image group information displayed on the display screen.

2. The display control apparatus according to claim 1, wherein
a representative image of the plurality of representative images is an image spaced away in an image arrangement order in the search target image group.

3. The display control apparatus according to claim 1, wherein
the plurality of representative images and the image group information are alternately arranged and displayed on the display screen.

4. The display control apparatus according to claim 1, wherein
the image group information further indicates that the image other than the plurality of representative images is present along a specific order between the plurality of the representative images in the search target image group in which the image is saved in the specific order.

5. The display control apparatus according to claim 1, wherein the CPU is further configured to:
receive a third user input to select one representative image of the plurality of the representative images displayed on the display screen; and
control the display screen to display only the one representative image.

6. The display control apparatus according to claim 1, wherein the CPU is further configured to
control the display screen to display an image other than the representative image extracted from the image group corresponding to the selected image group information as the image group information.

7. The display control apparatus according to claim 1, wherein the CPU is further configured to:
determine that a number of images in the search target image group is one of equal to or less than a specific number; and
display all the images in the search target image group as thumbnail images based on the determination that the number of images in the search target image group is the one of equal to or less than the specific number.

8. The display control apparatus according to claim 1, wherein
the search target image group is sorted into a plurality of groups, and
each representative image of the plurality of representative images is extracted with respect to each of the plurality of groups.

9. The display control apparatus according to claim 1, wherein
each representative image of the plurality of representative images is an image that includes added tag information.

10. The display control apparatus according to claim 1, wherein
each representative image of the plurality of representative images is an image on which a specific image processing is performed.

11. The display control apparatus according to claim 1, wherein
each representative image of the plurality of representative images is an image displayed on the display screen for at least a specific time.

12. The display control apparatus according to claim 1, wherein
each representative image of the plurality of representative images is an image displayed on the display screen for at least a number of times.

13. The display control apparatus according to claim 1, wherein
each representative image of the plurality of representative images is an image having color information of at least a specific value.

14. A display control method, comprising:
extracting a plurality of representative images from a search target image group;
controlling a display screen to display:
the plurality of representative images extracted from the search target image group, and
image group information, wherein
the image group information indicates presence of an image other than the plurality of representative images in the search target image group,
the image group information is displayed between the plurality of representative images, and
the image group information is displayed in a form different from the plurality of the representative images;
receiving a first user input to select the image group information displayed on the display screen;
extracting a representative image from an image group corresponding to the selected image group information;
controlling the display screen to display the extracted representative image;
receiving a second user input to cancel the selection of the image group information displayed on the display screen; and
excluding an image corresponding to the selected image group information from the search target image group based on the received second user input to cancel the selection of the image group information displayed on the display screen.

15. A non-transitory computer-readable medium having stored thereon computer-executable instructions which, when executed by a computer, cause the computer to execute operations, the operations comprising:
extracting a plurality of representative images from a search target image group;
controlling a display screen to display:
the plurality of representative images extracted from the search target image group, and
image group information, wherein
the image group information indicates presence of an image other than the plurality of representative images in the search target image group,
the image group information is displayed between the plurality of representative images, and
the image group information is displayed in a form different from the plurality of the representative images;
receiving a first user input to select the image group information displayed on the display screen;
extracting a representative image from an image group corresponding to the selected image group information;
controlling the display screen to display the extracted representative image;
receiving a second user input to cancel the selection of the image group information displayed on the display screen; and
excluding an image corresponding to the selected image group information from the search target image group based on the received second user input to cancel the selection of the image group information displayed on the display screen.

* * * * *